US012285025B2

(12) United States Patent
Duggins et al.

(10) Patent No.: US 12,285,025 B2
(45) Date of Patent: Apr. 29, 2025

(54) MULTI-LAYER SMOKELESS TOBACCO COMPOSITION

(75) Inventors: Donna Walker Duggins, Winston-Salem, NC (US); John-Paul Mua, Advance, NC (US); Darrell Eugene Holton, Jr., Clemmons, NC (US); Daniel Verdin Cantrell, Lewisville, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 2435 days.

(21) Appl. No.: 13/370,600

(22) Filed: Feb. 10, 2012

(65) Prior Publication Data

US 2013/0206150 A1    Aug. 15, 2013

(51) Int. Cl.
| A23G 3/48 | (2006.01) |
| A23G 3/54 | (2006.01) |
| A24B 13/00 | (2006.01) |
| A24B 15/24 | (2006.01) |

(52) U.S. Cl.
CPC ............... *A23G 3/48* (2013.01); *A23G 3/54* (2013.01); *A24B 13/00* (2013.01); *A24B 15/24* (2013.01)

(58) Field of Classification Search
None
See application file for complete search history.

(56) References Cited

U.S. PATENT DOCUMENTS

| 1,376,586 | A | 5/1921 | Schwartz |
| 3,696,917 | A | 10/1972 | Levi |
| 4,506,682 | A | 3/1985 | Muller |
| 4,513,756 | A | 4/1985 | Pittman et al. |
| 4,528,993 | A | 7/1985 | Sensabaugh, Jr. et al. |
| 4,624,269 | A | 11/1986 | Story et al. |
| 4,987,907 | A | 1/1991 | Townsend |
| 4,991,599 | A | 2/1991 | Tibbetts |
| 5,092,352 | A | 3/1992 | Sprinkle, III et al. |
| 5,301,694 | A | 4/1994 | Raymond et al. |
| 5,387,416 | A | 2/1995 | White et al. |
| 6,668,839 | B2 | 12/2003 | Williams |
| 6,834,654 | B2 | 12/2004 | Williams |
| 6,953,040 | B2 | 10/2005 | Atchley et al. |
| 7,032,601 | B2 | 4/2006 | Atchley et al. |
| 7,694,686 | B2 | 4/2010 | Atchley et al. |
| 8,545,870 | B2 * | 10/2013 | Dupinay .............. A61K 9/0056 424/434 |
| 2004/0020503 | A1 | 2/2004 | Williams |
| 2004/0146599 | A1 * | 7/2004 | Andersen ............. A23G 3/0095 426/3 |
| 2005/0115580 | A1 | 6/2005 | Quinter et al. |
| 2006/0171994 | A1 | 8/2006 | Dupinay et al. |
| 2006/0191548 | A1 | 8/2006 | Strickland et al. |
| 2007/0062549 | A1 | 3/2007 | Holton et al. |
| 2007/0081949 | A1 | 4/2007 | Dam et al. |
| 2007/0186941 | A1 | 8/2007 | Holton et al. |
| 2007/0186942 | A1 | 8/2007 | Strickland et al. |
| 2008/0029110 | A1 | 2/2008 | Dube et al. |
| 2008/0029116 | A1 | 2/2008 | Robinson et al. |
| 2008/0173317 | A1 | 7/2008 | Robinson et al. |
| 2008/0196730 | A1 | 8/2008 | Engstrom et al. |
| 2008/0209586 | A1 | 8/2008 | Nielsen et al. |
| 2008/0305216 | A1 | 12/2008 | Crawford et al. |
| 2009/0004248 | A1 | 1/2009 | Bunick et al. |
| 2009/0014018 | A1 | 1/2009 | Sengupta et al. |
| 2009/0133703 | A1 | 5/2009 | Strickland et al. |
| 2009/0293889 | A1 | 12/2009 | Kumar et al. |
| 2010/0004294 | A1 | 1/2010 | Axelsson et al. |
| 2010/0124560 | A1 | 5/2010 | Hugerth et al. |
| 2010/0291245 | A1 | 11/2010 | Gao et al. |
| 2011/0139164 | A1 | 6/2011 | Mua et al. |
| 2011/0220130 | A1 | 9/2011 | Mua et al. |
| 2012/0118310 | A1 | 5/2012 | Cantrell et al. |
| 2012/0138073 | A1 | 6/2012 | Cantrell et al. |
| 2012/0138074 | A1 | 6/2012 | Cantrell et al. |
| 2012/0298121 | A1 | 11/2012 | Kumar et al. |
| 2013/0074855 | A1 | 3/2013 | Holton, Jr. et al. |
| 2013/0078307 | A1 | 3/2013 | Holton, Jr. et al. |

FOREIGN PATENT DOCUMENTS

| EP | 2 233 134 | 9/2010 |
| KR | 2010 0117950 | 11/2010 |
| WO | WO 2004/095959 | 11/2004 |
| WO | WO 2005/023226 | 3/2005 |
| WO | WO 2006/114604 | 11/2006 |
| WO | WO 2007/104574 | 9/2007 |
| WO | WO 2008/112124 | 9/2008 |
| WO | WO 2008/140372 | 11/2008 |
| WO | WO 2009/037319 | 3/2009 |
| WO | WO 2010/044736 | 4/2010 |
| WO | WO 2010/132444 | 11/2010 |

OTHER PUBLICATIONS

Clapp W. Ultrafiltration . . . Sep. 2, 19906. RJ Reynolds. http://industrydocuments.library.ucsf.edu/tobacco/docs/ynwv0095.*
Wikipedia contributors, "Pastille," Wikipedia, The Free Encyclopedia, https://en.wikipedia.org/w/index.php?title=Pastille&oldid=857221102 (accessed Sep. 14, 2018). 2018.*

* cited by examiner

*Primary Examiner* — Michael J Felton
(74) *Attorney, Agent, or Firm* — Womble Bond Dickinson (US) LLP

(57) ABSTRACT

The invention provides a multi-layered smokeless tobacco product comprising two or more formulations with varying properties. In some embodiments, the smokeless tobacco products provide combinations of different organoleptic properties within the same product. In certain embodiment, these combinations allow for a modified release profile of active ingredients as the user enjoys the smokeless tobacco product. The invention further provides methods for making and using the smokeless tobacco product.

6 Claims, No Drawings

MULTI-LAYER SMOKELESS TOBACCO COMPOSITION

FIELD OF THE INVENTION

The present invention relates to products made or derived from tobacco, or that otherwise incorporate tobacco, and are intended for human consumption. In particular, the invention relates to smokeless tobacco products containing ingredients or components obtained or derived from plants of the *Nicotiana* species.

BACKGROUND OF THE INVENTION

Cigarettes, cigars and pipes are popular smoking articles that employ tobacco in various forms. Such smoking articles are used by heating or burning tobacco, and aerosol (e.g., smoke) is inhaled by the smoker. Tobacco also may be enjoyed in a so-called "smokeless" form. Particularly popular smokeless tobacco products are employed by inserting some form of processed tobacco or tobacco-containing formulation into the mouth of the user. See for example, the types of smokeless tobacco formulations, ingredients, and processing methodologies set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; and U.S. Pat. No. 7,694,686 to Atchley et al.; US Pat. Pub. Nos. 2004/0020503 to Williams; 2005/0115580 to Quinter et al.; 2006/0191548 to Strickland et al.; 2007/0062549 to Holton, Jr. et al.; 2007/0186941 to Holton, Jr. et al.; 2007/0186942 to Strickland et al.; 2008/0029110 to Dube et al.; 2008/0029116 to Robinson et al.; 2008/0173317 to Robinson et al.; 2008/0196730 to Engstrom et al.; 2008/0209586 to Neilsen et al.; 2008/0305216 to Crawford et al.; 2009/0065013 to Essen et al.; 2009/0293889 to Kumar et al.; 2010/0291245 to Gao et al; 2011/0139164 to Mua et al., PCT WO 04/095959 to Arnarp et al. and WO 2010/132444 A2 to Atchley, each of which is incorporated herein by reference. Exemplary smokeless tobacco products that have been marketed include those referred to as CAMEL Snus, CAMEL Orbs, CAMEL Strips and CAMEL Sticks by R. J. Reynolds Tobacco Company; GRIZZLY moist tobacco, KODIAK moist tobacco, LEVI GARRETT loose tobacco and TAYLOR'S PRIDE loose tobacco by American Snuff Company, LLC; KAYAK moist snuff and CHATTANOOGA CHEW chewing tobacco by Swisher International, Inc.; REDMAN chewing tobacco by Pinkerton Tobacco Co. LP; COPENHAGEN moist tobacco, COPENHAGEN Pouches, SKOAL Bandits, SKOAL Pouches, RED SEAL long cut and REVEL Mint Tobacco Packs by U.S. Smokeless Tobacco Company; and MARLBORO Snus and Taboka by Philip Morris USA.

It would be desirable to provide an enjoyable form of a tobacco product, such as a smokeless tobacco product, and to provide processes for preparing tobacco-containing compositions suitable for use in smokeless tobacco products.

SUMMARY OF THE INVENTION

The present invention provides a smokeless tobacco product comprising tobacco or a derivative thereof obtained from plants of the *Nicotiana* species. The products of the invention are compositions adapted for oral consumption and generally comprise a series of two or more different formulations having different properties that may be arranged in various ways. The different formulations comprising the product can be provided, for example, in a multi-layered form. For example, the smokeless tobacco composition can comprise an inner core of one formulation and one or more coatings of another formulation, which may be full or partial coatings. In this way, it is possible to combine formulations having different organoleptic properties within the same product to provide a unique composition. In certain embodiments, such multi-layered compositions afford a modified delivery profile during use. For example, certain formulations may provide for fast release of the active components of tobacco, whereas other formulations may provide for extended release of the active components of tobacco.

In one aspect of the invention is provided a multi-layered smokeless tobacco product comprising two or more formulations having different organoleptic properties, wherein the formulations are selected from the group consisting of i) a dissolvable formulation comprising a sugar substitute in an amount of at least about 80% by weight and a sugar alcohol syrup; ii) a meltable formulation comprising a lipid having a melting point of about 36° C. to about 45° C.; iii) a pastille formulation comprising a polysaccharide filler; iv) a pastille formulation comprising a sugar alcohol and a natural gum binder component; v) a chewable formulation comprising a binder, an emulsifier, and a lipid having a melting point of about 36° C. to about 45° C.; and vi) a hard coating formulation comprising a binder, a sugar substitute, and a sugar alcohol syrup; wherein at least one formulation further comprises tobacco, in the form of a particulate tobacco material or a tobacco extract. In certain embodiments, all formulations of the multi-layered smokeless tobacco product can comprise tobacco, in the form of a particulate tobacco material or a tobacco extract. The tobacco extract can optionally be a heat-treated extract that can be characterized as having an acrylamide content of less than about 500 ng/g.

The form of the smokeless tobacco product can vary. For example, in some embodiments, the form of the smokeless tobacco product is a core formulation surrounded by one or more continuous layers or a core formulation coated by one or more discontinuous (e.g., partial) layers so as to form a layered or side-by-side configuration of the two or more formulations. The number of layers can vary; for example, the multi-layered smokeless tobacco product can in some embodiments comprise between two and ten layers, such as between two and five layers.

The components of the various formulations can vary. For example, the dissolvable formulation, where present, may in certain embodiments comprise an ultrafiltered tobacco extract characterized as translucent or transparent. In some embodiments, the sugar substitute of the dissolvable formulation can comprise isomalt and/or the sugar alcohol syrup of the dissolvable formulation can comprise maltitol syrup.

In one exemplary embodiment, the dissolvable formulation comprises tobacco extract in an amount of about 3% by weight or greater; a sugar substitute in an amount of about 80% by weight or greater; and a sugar alcohol syrup.

The meltable formulation, where present, may in certain embodiments comprise a lipid having a melting point of about 38° C. to about 41° C. The lipid can be, for example, an animal or plant derived fat, wax, or oil. In one exemplary embodiment, the meltable formulation comprises particulate tobacco in an amount of from about 25% to about 45% by weight; a lipid having a melting point of about 36° C. to about 45° C. in an amount of from about 10% to about 50% by weight; and a filler in an amount of from about 20% to about 40% by weight. In another exemplary embodiment, the meltable formulation comprises a tobacco extract in an amount of about 2% by weight or greater; a lipid having a melting point of about 36° C. to about 45° C. in an amount of about 30% by weight or greater; and a filler in an amount of about 30% by weight or greater.

The pastille formulation iii), where present, may in certain embodiments comprise polydextrose as the polysaccharide filler component. The polysaccharide filler component in some embodiments can be present in an amount of from about 10 weight percent to about 25 weight percent of the pastille formulation on a dry weight basis. In one exemplary embodiment, the pastille formation iii) comprises tobacco in an amount of about 20% by weight or greater; a polysaccharide filler in an amount of about 10% by weight or greater, a humectant in an amount of about 20% by weight or greater; a binder in an amount of about 10% by weight or greater; and an emulsifier in an amount of about 1% by weight or greater.

The pastille formulation iv), where present, may in certain embodiments further comprise a tobacco-derived binder component. In some embodiments, the tobacco-derived binder component can comprise at least about 50 percent starch on a dry weight basis. In one exemplary embodiment, the pastille formation iv) comprises particulate tobacco in an amount of about 25% by weight or greater; humectant in an amount of about 0.5% by weight or greater; sugar alcohol filler in an amount of about 20% by weight or greater; and a binder in an amount of about 10% or greater. In another exemplary embodiment, the pastille formation iv) comprises tobacco extract in an amount of about 2% by weight or greater; humectant in an amount of about 0.5% by weight or greater; sugar alcohol filler in an amount of about 20% by weight or greater; and a natural gum binder in an amount of about 10% or greater.

The chewable formulation, where present, may in certain embodiments comprise gum arabic as the binder material. In one exemplary embodiment, the chewable formulation comprises a tobacco extract in an amount of about 2% by weight or greater, a binder material in an amount of about 30% by weight or greater, and a lipid having a melting point of about 36° C. to about 45° C. in an amount of about 15% by weight or greater.

The hard coating formulation, where present, may in certain embodiments comprise carboxymethylcellulose as the binder component. The hard coating formulation, where present, may in certain embodiments comprise isomalt as the sugar substitute. In one exemplary embodiment, the hard coating formulation comprises tobacco extract in an amount of about 2% by weight or greater; a binder; a sugar substitute in an amount of about 20% by weight or greater; and a sugar alcohol syrup in an amount of about 5% by weight or greater.

Any combination of two or more formulations as described herein can be used within the multi-layered smokeless tobacco products of the invention. For example, the product may, in certain embodiments, comprise two different formulations, wherein the formulations comprise: formulations i) and ii), formulations i) and iii), formulations i) and iv), formulations i) and v), formulations i) and vi), formulations ii) and iii), formulations ii) and iv), formulations ii) and v), formulations ii) and vi), formulations iii) and iv), formulations iii) and v), formulations iii) and vi), formulations iv) and v), or formulations iv) and vi), wherein the formulations can be arranged in any manner. For the foregoing, the listed formulations are meant to include permutations thereof and the formulations can be structured in various ways with respect to each other. For example, "formulation i) and ii)" can also include formulation ii) and formulation i), and "formulations iv) and vi)" can also include formulation vi) and formulation iv). In other words, "formulations i) and ii)" is intended to cover embodiments wherein formulation i) is the core and formulation ii) is a partial or complete layer thereon as well as embodiments wherein formulation ii) is the core and formulation i) is a partial or complete layer thereon.

In certain embodiments, combinations of three or more formulations as described herein can be used within the multi-layered smokeless tobacco products of the invention. In certain embodiments, the product may comprise formulations i), ii), and iii); formulations i), ii), and iv); formulations i), ii), and v); formulations i), ii), and vi); formulations i), iii), and iv); formulations i), iii), and v); formulations i), iii), and vi); formulations i), iv), and v); formulations i), iv), and vi); formulations i), v), and vi); formulations ii), iii), and iv); formulations ii), iii), and v); formulations ii), iii), and vi); formulations ii), iv), and v); formulations ii), iv), and vi); formulations ii), v), and vi); formulations iii), iv), and v); formulations iii), iv), and vi); or formulations iii), v), and vi), wherein the formulations can be arranged in any manner. For the foregoing, the listed formulations are meant to include permutations thereof and the formulations can be structured in various ways with respect to each other. For example, "formulations i), ii), and iii)" can also include formulation i), iii), and ii); formulation ii), iii), and i); formulation ii), i), and iii); formulation iii), i), and ii), and formulation iii), ii), and i). In other words, "formulations i), ii), and iii)" is intended to cover embodiments wherein formulation i) is the core, formulation ii) is a partial or complete layer on formulation i), and formulation iii) is a partial or complete layer on formulation ii), as well as embodiments wherein formulation i) is the core, formulation iii) is a partial or complete layer on formulation i), and formulation ii) is a partial or complete layer on formulation iii), as well as embodiments wherein formulation ii) is the core, formulation iii) is a partial or complete layer on formulation ii), and formulation i) is a partial or complete layer on formulation iii), as well as embodiments wherein formulation ii) is the core, formulation i) is a partial or complete layer on formulation ii), and formulation iii) is a partial or complete layer on formulation ii), as well as embodiments wherein formulation iii) is the core, formulation i) is a partial or complete layer on formulation iii), and formulation ii) is a partial or complete layer on formulation i), as well as embodiments wherein formulation iii) is the core, formulation ii) is a partial or complete layer on formulation iii), and formulation i) is a partial or complete layer on formulation ii).

In another aspect of the invention is provided a process for preparing a multi-layered smokeless tobacco product configured for insertion into the mouth of a user, comprising: preparing a first formulation by combining a tobacco material with one or more components selected from the group consisting of binders, lipid components, polysaccharide fillers, sugar substitutes, sugar alcohol syrups, flavorants, sweeteners, emulsifiers, disintegration aids, humectants, buffering agents, and mixtures thereof to form a smokeless tobacco mixture and forming the smokeless tobacco mixture into a desired form; preparing a second formulation by combining a tobacco material with one or more components selected from the group consisting of binders, lipid components, polysaccharide fillers, sugar substitutes, sugar alcohol syrups, flavorants, sweeteners, emulsifiers, disintegration aids, humectants, buffering agents, and mixtures thereof to form a smokeless tobacco mixture and forming the smokeless tobacco mixture into a desired form; and applying the second formulation to the first formulation, wherein the formulations are selected from formulations i), ii), iii), iv), v), and iv).

In certain embodiments, the first formulation can be formed into a desired form by pouring or otherwise introducing the smokeless tobacco mixture into a mold, injection molding the smokeless tobacco mixture, or other suitable means for providing a formulation. In certain embodiments, the second formulation can be applied by spray coating, dip coating, or by forming the second formulation into a sheet that is applied to the first formulation as a sandwiched coating. Spray coating or dip coating can be conducted at a temperature such that the first formulation is maintained in substantially intact form. In some embodiments, the method further comprises applying a third formulation as a coating on the second formulation. The third tobacco containing formulation can be applied, for example, by spray coating, dip coating, or by forming the third tobacco containing formulation into a sheet that is applied to the second formulation as a sandwiched coating.

DETAILED DESCRIPTION OF THE PREFERRED EMBODIMENTS

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water).

The present invention relates to smokeless tobacco products adapted for oral consumption that contain tobacco or a tobacco-derived material, wherein a given tobacco product comprises at least two different formulations. Specifically, such tobacco products generally comprise formulations with different organoleptic properties, such as multi-layered tobacco products, wherein two or more formulations are provided as layers of the tobacco products. Each formulation within the smokeless tobacco product can comprise a tobacco material or one or more components thereof. Although at least one formulation within the smokeless tobacco product comprises a tobacco material, in certain embodiments, one or more other formulations (e.g., one or more layers) within the smokeless tobacco product can is essentially (including completely) free of tobacco or components derived from tobacco. The invention further provides processes for preparing multi-layered smokeless tobacco products.

By "layered" is meant that the structure of the multi-layered smokeless tobacco composition is generally that of a core, surrounded by one or more coating layers, which may be partial or complete layers. In other words, each coating layer may completely coat the core or previous layer or may only cover portions thereof. The core can be any shape, such as a flattened sheet or structure of a given shape (e.g., square, round, oval, oblong, or rectangular) or a shape that can be described generally as spherical, cylindrical (e.g., ranging form the general shape of a flattened disc to the general shape of a relatively long, slender stick), helical, obloid, or the like). In some embodiments, the core and/or multi-layered smokeless tobacco composition can have the form of a bead, granular powder, capsule, film, strip, gel, or the like. The shape of the composition can, in certain embodiments, resemble a wide variety of pill, tablet, lozenge, capsule, and caplet types of products. It is noted that side-by-side type configurations are also intended to be encompassed within the present invention, e.g., wherein the composition comprises two layers adhered together along one surface and, optionally, additional layers adhered to one or both of those two layers. The number of layers comprising the smokeless tobacco product can vary but typically is about 2 to about 10, such as 2, 3, 4, 5, 6, 7, 8, 9, or 10 layers. It is noted that although the smokeless tobacco product is described herein as "layered" or "multi-layered," the layers may not be discrete layers of different formulations, with clear demarcation between the layers. For example, there may be some degree of mingling between the formulations comprising adjacent layers of the product. However, in preferred embodiments, the smokeless tobacco product retains properties and behaviors of the individual formulations.

The organoleptic properties of the one or more formulations that make up the multi-layered tobacco products generally vary. By "organoleptic" as used herein is meant any aspects that may be associated with the smokeless tobacco formulations as experienced by the senses of the user. Organoleptic properties include, but are not limited to, taste, smell, mouthfeel (e.g., texture, dissolvability/meltability, firmness, resilience, crunchiness, chewiness) and the like. For example, the formulations within a given multi-layered tobacco product can, in certain embodiments, have organoleptic properties independently selected from hard, dissolvable, chewable, chewy, meltable, crisp, and combinations thereof. Certain formulations useful as components of a smokeless tobacco product according to the invention can be described as lozenge-like or pastille-like. The resulting multi-layered tobacco product can, in certain embodiments, comprise a unique mixture of organoleptic properties as a result of the combination of formulations having varying organoleptic properties. For example, in one specific embodiment, the smokeless tobacco product may have a hard, lozenge-like outer formulation and a meltable core formulation such that, when placed into the mouth of the user, the user initially experiences a dissolving effect and later in use, experiences a melting effect. It is noted that numerous other combinations of formulations providing varying combinations of organoleptic properties are encompassed herein.

As used herein, the terms "dissolve," "dissolving," and "dissolvable" refer to formulations having aqueous-soluble components that interact with moisture in the oral cavity and enter into solution, thereby causing gradual consumption of the product.

As used herein, "melt," "melting," and "meltable" refer to the ability of the formulation to change from a solid state to a liquid state. That is, melting occurs when a substance (e.g., the formulation within a smokeless tobacco product) changes from solid to liquid, usually by the application of heat. The application of heat in regard to the smokeless tobacco product of the present invention is provided by the internal temperature of a user's mouth. Thus, the term "meltable" refers to a formulation that is capable of liquefying in the mouth of the user as the product changes phase from solid to liquid, and is intended to distinguish formulations and/or products that merely disintegrate in the oral cavity through loss of cohesiveness within the formulation or formulations that merely dissolve in the oral cavity as aqueous-soluble components of the formulation interact with moisture.

As used herein, the term "pastille" refers to a dissolvable oral formulation made by solidifying a liquid or gel composition, such as a composition that includes a gelling or binding agent, so that the final product is a hardened solid gel. In certain embodiments, such formulations are characterized by sufficient cohesiveness to withstand light chewing action in the oral cavity without rapidly disintegrating. Pastille-like formulations of the disclosure typically do not exhibit a highly deformable chewing quality as found in conventional chewing gum.

As used herein, "chewable" means deformable in the mouth with a cohesiveness greater than that of a pastille, but generally less than that of a gum. Such formulations may be characterized by sufficient cohesiveness to withstand a greater extent of chewing than a pastille; however, such compositions generally disintegrate in the oral cavity (unlike gum formulations).

As used herein, "hard coating-like" means a layer that exhibits some degree of hardness and/or crunchiness. It is generally a somewhat thin layer, allowing it to be easily broken by teeth of the user and/or readily dissolved in the mouth of the user. Although it is referred to herein as a "coating," it is noted that this layer need not comprise an exterior layer of the smokeless tobacco product, and may comprise an interior layer of the product.

The selection of the plant from the *Nicotiana* species utilized in the one or more tobacco-containing components of the products and processes of the invention can vary; and in particular, the type of tobacco or tobaccos may vary. Tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Passanda, Cubano, Jatin and Bezuki tobaccos), light air cured (e.g., North Wisconsin and Galpao tobaccos), Indian air cured, Red Russian and *Rustica* tobaccos, as well as various other rare or specialty tobaccos. Descriptions of various types of tobaccos, growing practices and harvesting practices are set forth in *Tobacco Production, Chemistry and Technology*, Davis et al. (Eds.) (1999), which is incorporated herein by reference. Various representative types of plants from the *Nicotiana* species are set forth in Goodspeed, *The Genus Nicotiana*, (Chonica Botanica) (1954); U.S. Pat. No. 4,660,577 to Sensabaugh, Jr. et al.; U.S. Pat. No. 5,387,416 to White et al.; U.S. Pat. No. 7,025,066 to Lawson et al.; and U.S. Pat. No. 7,798,153 to Lawrence, Jr.; and US Patent Appl. Pub. No. 2008/0245377 to Marshall et al.; each of which is incorporated herein by reference.

Exemplary *Nicotiana* species include *N. tabacum, N. rustica, N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata, N.×sanderae, N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. simulans, N. stocktonii, N. suaveolens, N. umbratica, N. velutina, N. wigandioides, N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis subsp. Hersperis, N. pauciflora, N. petunioides, N. quadrivalvis, N. repanda, N. rotundifolia, N. solanifolia* and *N. spegazzinii*.

*Nicotiana* species can be derived using genetic modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al. and U.S. Pat. No. 7,230,160 to Benning et al.; US Patent Appl. Pub. No. 2006/0236434 to Conkling et al.; and 2008/0209586 to Nielsen et al., which are all incorporated herein by reference. For the preparation of smokeless tobacco products, in some embodiments, harvested plants of the *Nicotiana* species are subjected to a curing process. Descriptions of various types of curing processes for various types of tobaccos are set forth in *Tobacco Production, Chemistry and Technology*, Davis et al. (Eds.) (1999). Exemplary techniques and conditions for curing flue-cured tobacco are set forth in Nestor et al., *Beitrage Tabakforsch. Int.*, 20, 467-475 (2003) and U.S. Pat. No. 6,895,974 to Peele, which are incorporated herein by reference. Representative techniques and conditions for air curing tobacco are set forth in Roton et al., *Beitrage Tabakforsch*. Int., 21, 305-320 (2005) and Staaf et al., *Beitrage Tabakforsch*. Int., 21, 321-330 (2005), which are incorporated herein by reference. Certain types of tobaccos can be subjected to alternative types of curing processes, such as fire curing or sun curing. Typically, harvested tobaccos that are cured are then aged. Tobacco compositions including dark air cured tobacco are set forth in US Patent Appl. Pub. No. 2008/0245377 to Marshall et al., which is incorporated herein by reference. See also, types of tobacco as set forth, for example, in US Patent Appl. Pub. No. 2011/0247640 to Beeson et al., which is incorporated herein by reference.

The *Nicotiana* species can be selected for the content of various compounds that are present therein. For example, where tobacco extracts are employed in the products of the present invention, plants can be selected on the basis that those plants produce relatively high quantities of one or more of the compounds desired to be isolated therefrom. In certain embodiments, plants of the *Nicotiana* species (e.g., Galpao commun tobacco) are specifically grown for their abundance of leaf surface compounds. Tobacco plants can be grown in greenhouses, growth chambers, or outdoors in fields, or grown hydroponically.

Various parts or portions of the plant of the *Nicotiana* species can be employed. For example, virtually all of the plant (e.g., the whole plant) can be harvested, and employed as such. Alternatively, various parts or pieces of the plant can be harvested or separated for further use after harvest. For example, the flower, leaves, stem, stalk, roots, seeds, and various combinations thereof, can be isolated for further use or treatment.

The post-harvest processing of the plant or portion thereof can vary. After harvest, the plant, or portion thereof, can be used in a green form (e.g., the plant or portion thereof can be used without being subjected to any curing process). For example, the plant or portion thereof can be used without being subjected to significant storage, handling or processing conditions. In certain situations, it is advantageous for the plant or portion thereof be used virtually immediately after harvest. Alternatively, for example, a plant or portion thereof in green form can be refrigerated or frozen for later use, freeze dried, subjected to irradiation, yellowed, dried, cured (e.g., using air drying techniques or techniques that employ application of heat), heated or cooked (e.g., roasted, fried or boiled), or otherwise subjected to storage or treatment for later use. Such tobacco can also be subjected to aging conditions.

The tobacco material may in certain embodiments be cased and dried, and then ground to the desired form. For example, in some instances, the tobacco material formulation may be cased with an aqueous casing containing components such as sugars (e.g., fructose, glucose, and sucrose), humectants (e.g., glycerin and propylene glycol), flavoring ingredients (e.g., cocoa and licorice), and the like. Non-aqueous casing components may be applied to the tobacco in amounts of about 1 percent to about 15 percent, based on the dry weight of the tobacco.

The harvested plant or portion thereof can be physically processed. The plant or portion thereof can be separated into individual parts or pieces (e.g., the leaves can be removed from the stems, and/or the stems and leaves can be removed from the stalk). The harvested plant or individual parts or pieces can be further subdivided into parts or pieces (e.g., the leaves can be shredded, cut, comminuted, pulverized, milled or ground into pieces or parts that can be characterized as filler-type pieces, granules, particulates or fine powders). The plant, or parts thereof, can be subjected to external forces or pressure (e.g., by being pressed or subjected to roll treatment). When carrying out such processing conditions, the plant or portion thereof can have a moisture content that approximates its natural moisture content (e.g., its moisture content immediately upon harvest), a moisture content achieved by adding moisture to the plant or portion thereof, or a moisture content that results from the drying of the plant or portion thereof. For example, powdered, pulverized, ground or milled pieces of plants or portions thereof can have moisture contents of less than about 25 weight percent, often less than about 20 weight percent, and frequently less than about 15 weight percent.

The tobacco material can be used in various forms. For example, it can be used in a form that can be described as particulate (i.e., shredded, ground, granulated, or powder form). The manner by which the tobacco material is provided in a finely divided or powder type of form may vary. Preferably, plant parts or pieces are comminuted, ground or pulverized into a particulate form using equipment and techniques for grinding, milling, or the like. Most preferably, the plant material is relatively dry in form during grinding or milling, using equipment such as hammer mills, cutter heads, air control mills, or the like. In certain embodiments, the tobacco material is employed within smokeless tobacco formulations in the form of parts or pieces that have an average particle size less than about 50 microns. In one embodiment, the average particle size of the tobacco particles may be less than or equal to about 25 microns. In some instances, the tobacco particles may be sized to pass through a screen mesh. If desired, air classification equipment may be used to ensure that small sized tobacco particles of the desired sizes, or range of sizes, may be collected. If desired, differently sized pieces of granulated tobacco may be mixed together.

The plant of the *Nicotiana* species or portions thereof can be subjected to other types of processing conditions. For example, components can be separated from one another, or otherwise fractionated into chemical classes or mixtures of individual compounds. Typical separation processes can include one or more process steps (e.g., solvent extraction using polar solvents, organic solvents, or supercritical fluids), chromatography, distillation, filtration, recrystallization, and/or solvent-solvent partitioning. Exemplary extraction and separation solvents or carriers include water, alcohols (e.g., methanol or ethanol), hydrocarbons (e.g., heptane and hexane), diethyl ether methylene chloride and supercritical carbon dioxide For example, in certain embodiments, at least a portion of the tobacco material employed in one or more of the tobacco formulations of the invention can have the form of an extract such as an extract obtained by extracting tobacco using a solvent having an aqueous character (e.g., distilled water or tap water). As such, aqueous tobacco extracts can be provided by extracting tobacco with water, such that water insoluble pulp material is separated from the aqueous solvent and the water soluble and dispersible tobacco components dissolved and dispersed therein. According to the invention, tobacco extracts for use in the smokeless tobacco products described herein can be green extracts (e.g., from freshly-harvested tobacco plants, flash-dried green plants or frozen green plants) or extracts from dried and/or cured tobaccos (e.g., alternative cured leaf, semi-cured leaf, over-cured leaf, normally cured leaf, fermented leaf, fire-cured leaf, cigar leaf, or shade leaf).

The tobacco extract can be employed in a variety of forms. For example, the aqueous tobacco extract can be isolated in an essentially solvent free form, such as can be obtained as a result of the use of a spray drying or freeze drying process, or other similar types of processing steps. Alternatively, the aqueous tobacco extract can be employed in a liquid form, and as such, the content of tobacco solubles within the liquid solvent can be controlled by selection of the amount of solvent employed for extraction, concentration of the liquid tobacco extract by removal of solvent, addition of solvent to dilute the liquid tobacco extract, or the like. Exemplary techniques for extracting components of tobacco are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,284,875 to Turpen et al.; U.S. Pat. No. 6,298,859 to Kierulff et al.; U.S. Pat. No. 6,772,767 to Mua et al.; U.S. Pat. No. 6,817,970 to Berit et al.; U.S. Pat. No. 6,906,172 to Bratcher et al.; U.S. Pat. No. 7,034,128 to Turpen et al.; U.S. Pat. No. 7,048,211 to Bratcher et al.; and U.S. Pat. No. 7,337,782 to Thompson, all of which are incorporated by reference herein.

Other types of separation techniques are set forth, for example, in Brandt et al., *LC-GC Europe*, p. 2-5 (March, 2002) and Wellings, *A Practical Handbook of Preparative HPLC* (2006), which are incorporated herein by reference. In addition, the plant or portions thereof can be subjected to the types of treatments set forth in Ishikawa et al., *Chem. Pharm. Bull.*, 50, 501-507 (2002); Tienpont et al., *Anal. Bioanal. Chem.*, 373, 46-55 (2002); Ochiai, *Gerstel Solutions Worldwide*, 6, 17-19 (2006); Coleman, III, et al., *J. Sci. Food and Agric.*, 84, 1223-1228 (2004); Coleman, III et al., *J. Sci. Food and Agric.*, 85, 2645-2654 (2005); Pawliszyn, ed., *Applications of Solid Phase Micro extraction, RSC Chromatography Monographs*, (Royal Society of Chemistry, UK) (1999); Sahraoui et al., *J. Chrom.*, 1210, 229-233 (2008); and 5,301,694 to Raymond et al., which are all incorporated herein by reference.

In some embodiments utilizing a tobacco extract in spray-dried or freeze-dried particulate form, it is useful to mix the tobacco extract with an extender component (e.g., a filler or binder components noted herein such as maltodextrin, cyclodextrin, or gum arabic) prior to the drying process to form a particulate dried mixture that can exhibit improved mixing properties, resulting in a more homogeneous final product. For example, an extender component can be added to the aqueous tobacco extract in an amount sufficient to raise the pre-drying solids content of the aqueous composition to about 18 to about 22 percent by weight (e.g., about 20 percent by weight). Thereafter, the combined mixture can be spray-dried or freeze-dried, and the resulting material will typically have a weight ratio of extract to extender of about 7:1 to about 1:1, more often about 5:1 to about 2:1 (e.g., about 3:1).

In certain embodiments, a plant of the *Nicotiana* species or portions thereof (e.g., an aqueous extract thereof) is subjected to processing intended to provide improved clarity of the tobacco material. A tobacco extract with improved clarity can be obtained, for example, by removing high molecular weight components from the tobacco extract (including, but not limited to, high molecular weight Maillard browning polymers, proteins, polysaccharides, certain pigments, and bacteria). Various methods can be used for this purpose, including size exclusion chromatography, microfiltration, ultrafiltration, nanofiltration, reverse osmosis, and combinations thereof.

In one embodiment, ultrafiltration is used to remove high molecular weight components in the tobacco material. The ultrafiltration method is typically applied to a tobacco material comprising a tobacco extract (e.g., an aqueous tobacco extract). In ultrafiltration, the material to be filtered is brought into contact with a semipermeable membrane as described in more detail in U.S. patent application Ser. No. 13/240,525 to Holton, Jr. filed on Sep. 22, 2011, which is incorporated herein by reference. In such embodiments, the ultrafiltration step is designed to achieve a tobacco extract having a decreased level of suspended solids, and thus an increased level of clarity.

Commercial ultrafiltration systems are readily available and may be used in some embodiments for ultrafiltration of tobacco extracts. For example, commercial suppliers such as Millipore, Spectrum® Labs, Pall Corporation, Whatman®, Porex Corporation, and Snyder Filtration manufacture various filter membranes and cartridges, and/or filtration systems (e.g., tangential flow filtration systems). Exemplary membranes include, but are not limited to, Biomax® and Ultracel® membranes and Pellicon® XL cassettes (from Millipore), Microkros®, Minikros®, and KrosFlo® Hollow Fiber Modules (from Spectrum® Labs), and Microza filters and Centramate,™ Centrasette,™ Maximate™, and Maxisette™ Tangential Flow Filtration Membrane Cassettes. Commercially available filtration systems include, but are not limited to, Millipore's Labscale™ Tangential Flow Filtration (TFF) system and Spectrum® Labs' KrosFlo® and MiniKros® Tangential Flow Filtration Systems.

Filters and/or membranes that may be useful according to the present invention include those with molecular weight cutoffs of less than about 100,000 Da, less than about 75,000 Da, less than about 50,000, less than about 25,000 Da, less than about 20,000 Da, less than about 15,000 Da, less than about 10,000 Da, and less than about 5,000 Da. In certain embodiments, a multistage filtration process is used to provide an extract with improved clarity. Such embodiments employ multiple filters and/or membranes of different (typically decreasing) molecular weight cutoffs. Any number of filters and/or membranes can be used in succession according to the invention. For example, a first filtration may be conducted using a 50,000 Da molecular weight cutoff filter and a second filtration may be conducted using a 5,000 Da molecular weight cutoff filter. Thus, depending on the molecular weight cutoff of the filters, the ultrafiltered extract may comprise only compounds with molecular weights below about 50,000, below about 25,000, below about 10,000 Da, below about 7,500 Da, below about 5,000 Da, below about 2,500 Da, or below about 1,000 Da. The ultrafiltered extract typically comprises primarily sugars, nicotine, and amino acids. The ultrafiltered extract may exhibit a level of improvement in clarity over the non-ultrafiltered extract.

Clarity of the extract, and tobacco products according to the invention made therefrom, is typically defined in terms of translucency. As used herein, "translucent" or "translucency" refers to materials allowing some level of light to travel therethrough diffusely. In various embodiments, certain materials of the invention (e.g., certain tobacco extracts or final smokeless tobacco products comprising components made therefrom) can have such a high degree of clarity that the material or a portion thereof can be classified as "transparent" or exhibiting "transparency," which is defined as a material allowing light to pass freely through without significant diffusion. The clarity of the ultrafiltered extract is such that there is some level of translucency as opposed to opacity (which refers to materials that are impenetrable by light). In certain embodiments, the ultrafiltered extract is visually analyzed or is analyzed by contacting the extract with light and measuring the percent of light that has not been absorbed and/or dispersed by the extract. The measurement can be done, for example, using a standard spectrophotometer at a given wavelength. The spectrophotometer is typically calibrated with deionized water, which is assigned a transparency value of 100%. Ultrafiltered extract may, in some embodiments, exhibit a translucency of greater than about 5%, greater than about 10%, greater than about 15%, greater than about 20%, greater than about 25%, greater than about 30%, greater than about 40%, greater than about 50%, greater than about 60%, greater than about 60%, greater than about 70%, greater than about 80%, or greater than about 90%. Typically, the ultrafiltered extract will not be colorless, and will have some discernible brown/black coloring. Following ultrafiltration, the extract can be stored in the refrigerator or freezer or the extract can be freeze dried or spray dried prior to use in the products of the invention. In certain embodiments, it is provided in syrup form.

In some embodiments, tobacco materials or extracts thereof can be heat-treated prior to incorporation within the smokeless tobacco products of the present invention. The optional heat-treatment can be applied to any tobacco or extract thereof and can, in some embodiments, be employed in combination with ultrafiltration. For example, a tobacco material can be thermally processed by mixing the tobacco material, water, and an additive selected from the group consisting of lysine, glycine, histidine, alanine, methionine, glutamic acid, aspartic acid, proline, phenylalanine, valine, arginine, di- and trivalent cations, asparaginase, saccharides, phenolic compounds, reducing agents, compounds having a free thiol group, oxidizing agents (e.g., hydrogen peroxide), oxidation catalysts, plant extracts, and combinations thereof, to form a moist tobacco mixture; and heating the moist tobacco mixture at a temperature of at least about 60° C. to form a heat-treated tobacco mixture.

In one embodiment, the treated tobacco extract is heat treated in the presence of water, NaOH, and an additive (e.g., lysine) at about 88° C. for about 60 minutes. Such heat treatment can help prevent acrylamide production resulting from reaction of asparagine with reducing sugars in tobacco materials and can provide some degree of pasteurization. See, for example, US Pat. Pub. No. 2010/0300463 to Chen et al., which is incorporated herein by reference. In certain embodiments wherein a heat-treated tobacco extract is used in a smokeless tobacco product of the present invention, the product can be characterized by very low acrylamide content. For example, in some embodiments, the smokeless tobacco product is characterized by an acrylamide content of less than about 500 ppb (ng/g), less than about 400 ppb, less than about 300 ppb, less than about 200 ppb, or less than about 100 ppb.

In some instances, prior to preparation of the tobacco material formulation, the tobacco parts or pieces may be irradiated, or those parts and pieces may be pasteurized, or otherwise subjected to controlled heat treatment. Additionally, if desired, after preparation of all or a portion of the tobacco material formulation, the component materials may be irradiated, or those component materials may be pasteurized, or otherwise subjected to controlled heat treatment. For example, a tobacco material formulation may be prepared, followed by irradiation or pasteurization, and then flavoring ingredient(s) may be applied to the formulation. Representative processes are set forth in US Pat. Pub. Nos. 2009/0025738 to Mua et al., 2009/0025739 to Brinkley et al., and 2011/0247640 to Beeson et al., which are incorporated herein by reference.

Tobacco in one or more of the various forms as described herein (e.g., tobacco extract or particulate tobacco) is used in the production of smokeless tobacco products. Specifically, a tobacco material can be combined with one or more additional components to give a tobacco formulation that is used in combination with other tobacco-containing or non-tobacco-containing formulations to provide the multi-layered smokeless tobacco products of the present invention. The types of formulations included within a smokeless tobacco product according to the invention can vary, and can include, but are not limited to, lozenge-type formulations, meltable-type formulations, chewable-type formulations, hard coating-type formulations, and starch-molded and injection molded formulations. Each component can be tobacco-containing or can be tobacco-free. However, at least one component of the multi-layered smokeless tobacco composition typically comprises tobacco.

The components of each formulation in the multi-layered smokeless tobacco composition can vary and are independently selected such that the two or more formulations generally comprise different combinations of other components. The individual components (including, optionally, tobacco material) can be processed, blended, formulated, combined and/or mixed to produce the desired formulation. See, for example, representative components, combination of components, relative amounts of those components and ingredients relative to tobacco, and manners and methods for employing those components, set forth in US Pat. Pub. Nos. 2007/0062549 to Holton, Jr. et al. and 2007/0186941 to Holton, Jr. et al., each of which is incorporated herein by reference.

The other components of the formulations can be artificial or can be obtained or derived from herbal or biological sources. Exemplary types of components that can be incorporated within one or more formulations according to the invention include salts (e.g., sodium chloride, potassium chloride, sodium citrate, potassium citrate, sodium acetate, potassium acetate, and the like), natural sweeteners (e.g., fructose, sucrose, glucose, maltose, vanillin, ethylvanillin glucoside, mannose, galactose, lactose, and the like), artificial sweeteners (e.g., sucralose, saccharin, aspartame, acesulfame K, neotame and the like), organic and inorganic fillers (e.g., grains, processed grains, puffed grains, maltodextrin, dextrose, calcium carbonate, calcium phosphate, corn starch, lactose, sugar alcohols such as isomalt, mannitol, xylitol, or sorbitol, finely divided cellulose, vegetable protein, and the like), binders (e.g., povidone, sodium carboxymethylcellulose and other modified cellulosic types of binders, sodium alginate, xanthan gum, starch-based binders, gum arabic, gellan gum, lecithin, and the like), gelling agents (e.g., fish gelatin), pH adjusters or buffering agents (e.g., metal hydroxides, preferably alkali metal hydroxides such as sodium hydroxide and potassium hydroxide, and other alkali metal buffers such as metal carbonates, preferably potassium carbonate or sodium carbonate, or metal bicarbonates such as sodium bicarbonate, and the like), emulsifiers, colorants (e.g., dyes and pigments, including caramel coloring, titanium dioxide, and the like), humectants (e.g., glycerin, propylene glycol, and the like), oral care additives (e.g., thyme oil, eucalyptus oil, and zinc), preservatives (e.g., potassium sorbate and the like), syrups (e.g., honey, high fructose corn syrup, and the like), disintegration or compressibility aids (e.g., microcrystalline cellulose, croscarmellose sodium, crospovidone, sodium starch glycolate, pregelatinized corn starch, and the like), flavorant and flavoring mixtures, antioxidants, and mixtures thereof. Exemplary types of components may include those described in, for example, U.S. Pat. Pub. No. 2010/0291245 to Gao et al., which is incorporated herein by reference.

The foregoing components can be provided in a powder or granulated form for mixing with the tobacco material, or otherwise may be provided in liquid form. Most preferably, the components when provided in a powder or granulated form are employed in the form of parts or pieces that have an average particle size less than about 50 microns. According to some aspects, the average particle size of the components may be about 25 microns or less. The moisture content of the components provided in a powder or granulated form may vary. Most preferably, the moisture content of the components provided in a powder or granulated form is less than about 10 weight percent, and may be less than about 5 percent, and is often less than about 2.5 weight percent. The components may be admixed with the tobacco material in, for example, a Hobart mixer with a paddle prior to adding any liquid components. In the event liquid components are provided, the resultant mixture may still have a relatively low moisture content of less than about 10 weight percent, and may be less than about 5 percent, and is often less than about 2.5 weight percent. The relative amounts of the various additive components within the smokeless tobacco product may vary.

The aforementioned types of components can be employed together (e.g., as component formulations) or separately (e.g., individual components can be added at different stages involved in the preparation of the tobacco formulation and the final tobacco product). The relative amounts of the various components within the smokeless tobacco formulation may vary, and typically are selected so as to provide the desired sensory and performance characteristics to the tobacco product. Furthermore, the aforementioned types of components may be encapsulated as provided in the final product or composition. Exemplary encapsulated components are described, for example, in WO 2010/132444 A2 to Atchley, which has been incorporated by reference herein.

Any of the above-noted classes of components for the smokeless tobacco compositions of the invention can be derived from tobacco material by subjecting at least a portion of a tobacco plant (e.g., leaves, seeds, flowers, stalks, roots, or stems) to a separation process, which typically can include multiple sequential extraction steps, in order to isolate desired components of the tobacco material. Exemplary separation processes include chromatography, distillation, filtration, recrystallization, solvent-solvent partitioning, cold pressing, solvent extraction (e.g., using solvents such as water, alcohols or hydrocarbons such as heptane or hexane), or a combination thereof. The resulting isolated tobacco component can be chemically transformed prior to use in the compositions of the invention. Exemplary chemical transformations include hydrogenation, esterification, transesterification, isomeric conversion, acetal formation, acetal decomposition, acid/base reaction, hydrolysis, thermal treatment, enzymatic treatment, and combinations of such steps.

Techniques for preparing tobacco isolates for use in the compositions of the invention are set forth, for example, in US Pat. Pub. Nos. 2011/0174323 to Coleman, III et al. and 2011/0259353 to Coleman, III et al., which are incorporated by reference herein in their entirety. Examples of the types of compounds that may be present in the tobacco isolate include hydrocarbons, cellulose, alcohols, aldehydes, ketones, carboxylic acids, amino acids, esters, lactones, anhydrides, carbohydrates (e.g., reducing sugars), phenols, quinones, ethers, nitriles, amines, amides, imides, plastid pigments, proteins, coenzyme-Q, pectin, starch, lignin, and lipids. Additional examples are described as natural tar diluents in PCT WO 2007/012980 to Lipowicz, which is incorporated by reference herein in its entirety. The type or function of a smokeless tobacco formulation prepared from a tobacco isolate will vary depending on the composition of the isolate, which can vary in part based on the extraction process employed, the portion of the tobacco plant involved, the type of chemical transformation utilized, and the like. Certain tobacco isolates can provide sugars, fillers, binders, disintegration or compressibility aids, or flavorants for the smokeless tobacco composition of the invention. For example, processes for obtaining and using tobacco-derived binder materials are described in U.S. Pat application Ser. No. 12/957,821 to Cantrell et al., filed Dec. 1, 2010, which is incorporated herein by reference.

As used herein, a "flavorant" or "flavoring agent" is any flavorful or aromatic substance capable of altering the sensory characteristics associated with the smokeless tobacco composition. Exemplary sensory characteristics that can be modified by the flavorant include, taste, mouthfeel, moistness, coolness/heat, and/or fragrance/aroma. The flavorants can be natural or synthetic, and the character of these flavors can be described as, without limitation, fresh, sweet, herbal, confectionary, floral, fruity or spice. Specific types of flavors include, but are not limited to, vanilla, coffee, chocolate, cream, mint, spearmint, menthol, peppermint, wintergreen, lavender, cardamon, nutmeg, cinnamon, clove, cascarilla, sandalwood, honey, jasmine, ginger, anise, sage, licorice, lemon, orange, apple, peach, lime, cherry, and strawberry. Flavorants utilized in the invention also can include components that are considered moistening, cooling or smoothening agents, such as eucalyptus. These flavors may be provided neat (i.e., alone) or in a composite (e.g., spearmint and menthol or orange and cinnamon). In some instances, the flavorant may be provided in a spray-dried form. Flavorants are typically present in an amount of about 0.5 to about 10 dry weight percent, often about 1 to about 6 dry weight percent, and most often about 2 to about 5 dry weight percent.

Sweeteners can be used in natural or artificial form or as a combination of artificial and natural sweeteners. In one embodiment, sucralose, sucrose, or a combination thereof is the primary sweetener ingredient. When present, a representative amount of sweetener, whether an artificial sweetener and/or natural sugar, may make up at least about 0.2 percent, at least about 1 percent, or at least about 5 percent, of the total dry weight of the composition. Preferably, the amount of sweetener within the composition will not exceed about 40 percent, often will not exceed about 35 percent, and frequently will not exceed about 30 percent, of the total dry weight of the composition.

Sucrose can be a particularly advantageous sweetener in certain embodiments (e.g., as a component of a starch-molded type formulation) as it is believed to contribute to the chewing resistance or "bounce" of the final product. In addition, while granulated sucrose provides far less sweetening effect as compared to sucralose, the presence of sucrose can be advantageous as an additional filler component. When these two sweeteners are present together, the sucralose is typically present in an amount of at least about 0.25 dry weight percent, often at least about 0.5 dry weight percent, and most often at least about 1.0 dry weight percent (e.g., about 0.25 to about 2.0 dry weight percent), and the sucrose is typically present in an amount of at least about 2.0 dry weight percent, often at least about 3.0 dry weight percent, and most often at least about 4.0 dry weight percent (e.g., about 1.0 to about 6.0 dry weight percent).

In certain embodiments, some formulations (or the entire smokeless tobacco product) are sugar-free, comprising one or more sugar substitutes. "Sugar-free" as used herein is intended to include products having less than about $\frac{1}{15}$th sugar by weight, or less than about $\frac{1}{10}$th sugar by weight. A sugar substitute, where used, may be provided in pure, solid form (e.g., granular or powdered form). In certain embodiments, the sugar substitute is dry, comprising a very low water content. For example, the sugar substitute can comprise less than about 5% water by weight, less than about 3% water by weight, less than about 2% water by weight, or less than about 1% water by weight.

In some embodiments, a syrup (e.g., corn syrup) preferably may be employed in an amount sufficient to provide desired flavor attributes to the smokeless tobacco composition. In some embodiments (e.g., in starch molded type formulations), syrup may be employed in amounts sufficient to provide chewiness and retard solubilization. A representative amount of syrup (e.g., high fructose corn syrup) may make up less than about 10 percent or less than about 5 percent of the total dry weight of the composition.

In certain embodiments, a sugar syrup or sugar alcohol syrup is added to a lozenge-type formulation to affect the re-crystallization of another component of the formulation during preparation (e.g., a melted sugar substitute). Exemplary sugar alcohol syrups for such purposes include maltitol syrup, xylitol, mannitol, glycerol, erythritol, threitol, arabitol, ribitol, mannitol, sorbitol, dulcitol, iditol, isomalt, lactitol, and polyglycitol syrups. Other syrups, such as corn syrup, golden syrup, or molasses can be used. The amount of sugar alcohol syrup can vary, but typically ranges from about 0.1% to about 2%, often from about 0.5% to about 1.5%, and more often about 1% by weight of the smokeless tobacco product mixture. In certain embodiments, the amount of sugar alcohol syrup is higher, for example, up to about 2% by weight of the mixture, up to about 5% by weight of the mixture, up to about 10% by weight of the mixture, or up to about 20% by weight of the mixture The smokeless tobacco compositions of the disclosure may typically include at least one filler ingredient. When a polysaccharide filler component is present, the optional filler ingredient may be provided in addition to the polysaccharide filler component. Such filler components of the composition often fulfill multiple functions, such as enhancing certain organoleptic properties such as texture and mouthfeel, enhancing cohesiveness or compressibility of the product, and the like. In certain embodiments (e.g., in starch molded-type formulations), sugar alcohols are particularly advantageous as filler components as they contribute some sweetness and do not disrupt the desired chewable characteristics of the final product. Sugar alcohols (e.g., isomalt) are polyols derived from monosaccharides or disaccharides that have a partially or fully hydrogenated form. Exemplary sugar alcohols have between about 4 and about 20 carbon atoms and include erythritol, arabitol, ribitol, isomalt, maltitol, dulcitol, iditol, mannitol, xylitol, lactitol, sorbitol, and combinations thereof (e.g., hydrogenated starch hydrolysates). A sugar alcohol can be added in the form of an aqueous solution or suspension, such as a solution or suspension with a solids content of about 50 to about 90 weight percent. Combinations of a sugar alcohol with a further filler component can also be used. When present, a representative amount of filler, whether an organic and/or inorganic filler, may make up at least about 10 percent, at least about 20 percent, or at least about 25 percent, based on the total dry weight of the composition. Preferably, the amount of additional filler within the composition will not exceed about 50 percent, and frequently will not exceed about 40 percent, of the total dry weight of the composition. In one embodiment, a sugar alcohol such as sorbitol is provided as an additional filler.

A salt (e.g., sodium chloride, flour salt) may be employed in amounts sufficient to provide desired sensory attributes to the smokeless tobacco composition. When present, a representative amount of salt is at least about 0.5 dry weight percent or at least about 1.0 dry weight percent or at least about 1.5 dry weight percent, but will typically make up less than about 5 percent of the total dry weight of the composition (e.g., about 0.5 to about 4 dry weight percent). In some embodiments, the salt, when present, will make up less than about 2 percent or less than about 1 percent of the total dry weight of the composition.

A humectant (e.g., glycerin) may be employed in amounts sufficient to provide desired moisture attributes to the smokeless tobacco composition. Further, in some instances, the humectant may impart desirable flow characteristics to the smokeless tobacco composition (e.g., for depositing in a starch mould). When present, a representative amount of humectant will typically make up at least about 1 percent of the total dry weight of the composition, at least about 1.5 dry weight percent, or at least about 2 dry weight percent. In certain embodiments, the amount of humectant is at least about 10 dry weight percent or at least about 20 dry weight percent. An exemplary dry weight range is about 1 to about 40 weight percent, more often about 3 to about 35 dry weight percent. In some embodiments, the humectant is provided in am amount of less than about 5 percent of the total dry weight of the composition (e.g., about 0.5 to about 4 dry weight percent).

A binder (or combination of binders) may be employed in amounts sufficient to provide the desired physical attributes and physical integrity to the smokeless tobacco composition. When present, a representative amount of binder may make up at least about 5 percent, at least about 10 percent, at least about 15 percent, at least about 20 percent, or at least about 25 percent of the total dry weight of the composition. Preferably, the amount of binder within the composition will not exceed about 35 percent, about 40 percent, or about 45 percent of the total dry weight of the composition. Often, the amount of binder within a desirable composition will not exceed about 20 percent, and frequently will not exceed about 15 percent, of the total dry weight of the composition. As noted previously, the binder can include a tobacco-derived material in some embodiments, which can be combined with one or more additional binder components. In certain embodiments, the binder material includes a natural gum. As used herein, a natural gum refers to polysaccharide materials of natural origin that are useful as thickening or gelling agents. Representative natural gums derived from plants, which are typically water soluble to some degree, include xanthan gum, guar gum, gum arabic, ghatti gum, gum tragacanth, karaya gum, locust bean gum, gellan gum, and combinations thereof.

An emulsifier may be employed in amounts sufficient to provide desired stabilization attributes to the smokeless tobacco composition. When present, a representative amount of emulsifier will typically make up less than about 5 percent of the total dry weight of the composition.

Certain buffering agents buffer within a pH range of about 6 to about 10, and exemplary buffering agents include metal hydroxides, metal carbonates, metal bicarbonates, or mixtures thereof. The buffering agent, where present, is typically present in an amount less than about 1 percent based on the dry weight of the formulation.

The specific components and amounts thereof in a given formulation will depend on the desired characteristics of that formulation. For example, the components can vary depending upon the desired flavor, texture, and other characteristics. Certain exemplary formulations are provided in more detail below. It is to be noted that these are only exemplary formulations and are not intended to be limiting of the invention.

For example, a typical lozenge-type formulation may comprise an ultrafiltered extract, a sugar substitute, and a sugar alcohol syrup. The sugar substitute (e.g., isomalt) is a non-hygroscopic sugar alcohol capable of forming a glassy matrix. In one particular embodiment of the present invention, a lozenge-type formulation comprises: a tobacco extract in an amount of at least about 3% by weight; a sugar substitute in an amount of at least about 80% by weight; and a sugar alcohol syrup. In certain embodiments, the sugar substitute is present in an amount of at least about 85% by weight or at least about 90% by weight. In a specific embodiment, a lozenge-type formulation may comprise isomalt, maltitol syrup, heat-treated, ultrafiltered tobacco extract, NaCl, and sucralose. In certain embodiments, the formulation is translucent. For more details on representative lozenge-type formulations, see U.S. patent application Ser. No. 13/240,525 to Holton, Jr. et al., filed on Sep. 22, 2011, which is incorporated herein by reference.

A typical meltable-type formulation generally comprises a tobacco material (e.g., a particulate tobacco material or a tobacco extract) and a lipid. The lipid can vary and may be, for example, a fat, oil, or wax substance (or combination thereof), forming a portion of the smokeless tobacco formulation. The lipid components can be derived from animal or plant material and typically comprise mostly triglycerides along with lesser amounts of free fatty acids and mono- or di-glycerides. In certain embodiments, the lipid is a plant-derived fat material that is solid or semi-solid at room temperature (i.e., at about 25° C.) and which at least partially liquefies when subjected to the temperature of the oral cavity of the user. The melting point of the lipid can vary and in certain embodiments may be within the range of about 36° C. to about 45° C. (e.g., about 38° C. to about 41° C.).

Plant-derived fats are comprised primarily of saturated or unsaturated fatty acid chains (most of which are bound within triglyceride structures) having a carbon length of about 10 to about 26 carbon atoms, more typically about 14 to about 20 carbon atoms, and most often about 14 to about 18 carbon atoms. Exemplary plant-derived fats that can be used include palm oil, palm kernel oil, soybean oil, cottonseed oil, and mixtures thereof. According to some aspects, the lipid substance may be hydrogenated, partially hydrogenated, or non-hydrogenated. In some instances, the lipid substance may include a blend of lipid components. For example, the lipid substance may include a blend of palm oil and palm kernel oil. The lipid substance is typically an individual ingredient separate and distinct from the particulate tobacco material used to form the smokeless tobacco composition.

In certain specific embodiments, a meltable-type formulation is provided, which comprises about 25 to about 45 percent particulate tobacco, about 10 to about 50 percent lipid component, about 0 to about 1 percent artificial sweetener, about 20 to about 40 percent filler, a flavorant in an amount of up to about 10 percent, and salt in an amount up to about 5 percent, based on the total dry weight of the smokeless tobacco composition. In some embodiments, a meltable-type formulation is provided, which comprises tobacco in the form of an extract, wherein the formulation comprises tobacco in an amount of about 2 percent or greater, a lipid component in an amount of about 30 percent or greater and a filler in an amount of about 30 percent or greater. Specific lipids and greater detail regarding meltable-type formulations comprising lipids can be found in U.S. patent application Ser. No. 13/330,929, filed Dec. 20, 2011 to Cantrell et al., which are both incorporated herein by reference.

A typical chewable-type formulation typically comprises a natural gum (e.g., gum arabic), a lipid component, and an emulsifier. In one specific embodiment, the chewable-type formulation comprises gum arabic, an emulsifier, a lipid component, glycerin, tobacco extract, sucralose, sodium chloride, sodium hydroxide, and a flavorant.

A typical hard coating-type formulation typically comprises a binder and a sugar alcohol syrup. In one specific embodiment, the outside matrix comprises tobacco extract, a binder, a sugar alcohol, isomalt, sodium hydroxide, sucralose, and a flavorant. Although hard coating-type formulations according to the invention typically comprise such components, it is noted that other types of coatings can be applied in certain embodiments and may, in some embodiments, be applied in addition to the hard coating-type formulation. For example, the entire multi-layered smokeless tobacco product of the invention and/or any of the component formulations described herein may, in certain embodiments, include an outer coating, which may comprise ingredients such as carnauba wax and/or pharmaceutically acceptable forms of shellacs, glazing compositions and surface polish agents. Application of a coating can be accomplished using techniques such as airless spraying, fluidized bed coating, use of a coating pan, or the like. Other materials for use as a coating can be polymeric in nature, such as cellulosic material (e.g., cellulose butyrate phthalate, hydroxypropyl methylcellulose phthalate, and carboxymethyl ethylcellulose), and polymers and copolymers of acrylic acid, methacrylic acid, and esters thereof. For example, such a coating can comprise a film-forming polymer, such as a cellulosic polymer, and an optional plasticizer. Other optional coating ingredients include flavorants, sweeteners, colorants, and salts.

A typical injection molded-type formulation (i.e., pastille) can comprise, for example, about 10 weight percent to about 25 weight percent of polysaccharide filler component on a dry weight basis. The polysaccharide filler can vary, but in certain embodiments, comprises polydextrose. Certain embodiments comprise one or more of a sugar alcohol filler (e.g., sorbitol), a binder comprising a water soluble gum (e.g., gum arabic), and/or components including flavorants, binders, emulsifiers, disintegration aids, humectants, and mixtures thereof. In one specific embodiment, the formulation comprises at least about 20 dry weight percent of tobacco material, based on the total weight of the composition; at least about 10 dry weight percent of polysaccharide filler component; at least about 10 dry weight percent of at least one binder; at least about 20 dry weight percent of at least one humectant; and at least about 1 dry weight percent of at least one emulsifier. For more details on representative injection molded-type formulations, see U.S. patent application Ser. No. 12/957,838 to Cantrell et al., filed on Dec. 1, 2010, which is incorporated herein by reference.

A typical starch molded-type formulation (i.e., pastille) may comprise, for example, particulate tobacco material, at least one binder or gelling agent in the form of a natural gum, and at least one sugar alcohol as a filler component. In another embodiment, the smokeless tobacco composition comprises particulate tobacco material, at least one binder or gelling agent in the form of a natural gum, sucrose, and corn syrup. For example, in one embodiment, a starch molded-type formulation comprises about 25 to about 35 percent tobacco, about 0.1 to about 2 percent artificial sweetener, about 1 to about 5 percent humectant, about 1 to about 5 percent natural sweetener, about 20 to about 30 percent sugar alcohol filler, about 10 to about 30 percent binder, flavoring ingredient in an amount of up to about 5 percent, and salt in an amount up to about 3 percent, based on the total dry weight of the smokeless tobacco composition.

One specific starch molded-type formulation comprises: at least about 25 dry weight percent of tobacco material, based on the total weight of the composition; at least about 10 dry weight percent of a sugar alcohol (e.g., sorbitol, isomalt, maltitol, and/or combinations thereof); at least about 10 or 15 dry weight percent of a natural gum binder component (e.g., gum arabic); at least about 0.5 dry weight percent of a tobacco-derived binder component; at least about 0.5 dry weight percent of a humectant (e.g., glycerin);

at least about 0.2 dry weight percent of a sweetener (e.g., sucralose); and at least about 0.5 dry weight percent of a flavorant. Another exemplary composition comprises: at least about 30 dry weight percent of tobacco material, based on the total weight of the composition; at least about 20 dry weight percent of a sugar alcohol; at least about 25 dry weight percent of a natural gum binder component; at least about 2 dry weight percent of a tobacco-derived binder component; at least about 2 dry weight percent of a humectant; at least about 1 dry weight percent of a sweetener; and at least about 4 dry weight percent of a flavorant. In a still further embodiment, the composition comprises: at least about 2 dry weight percent of tobacco material in the form of an aqueous tobacco extract, based on the total weight of the composition; at least about 30 dry weight percent of a sugar alcohol; at least about 40 dry weight percent of a natural gum binder component; at least about 2 dry weight percent of a humectant; and at least about 2 dry weight percent of a salt (e.g., NaCl). Yet another embodiment comprises: at least about 2 dry weight percent of tobacco material in the form of an aqueous tobacco extract, based on the total weight of the composition; at least about 30 dry weight percent of sucrose; at least about 40 dry weight percent of a natural gum binder component; at least about 2 dry weight percent of a syrup (e.g., corn syrup); at least about 2 dry weight percent of a humectant; and at least about 2 dry weight percent of a salt. For more details on representative starch molded-type formulations, see U.S. application Ser. No. 12/957,821 to Cantrell et al., filed Dec. 1, 2010, which is incorporated herein by reference.

The formulations that make up the smokeless tobacco product of the present invention can have various organoleptic properties. For example, a starch molded-type formulation can, in certain embodiments, be characterized as dissolvable and lightly chewable and is generally in the form of a hardened solid gel (e.g., a "pastille"). In certain embodiments, starch molded-type formulations are characterized by sufficient cohesiveness to withstand light chewing action in the oral cavity without rapidly disintegrating. Such formulations of the disclosure typically do not exhibit a highly deformable chewing quality as found in conventional chewing gum. A meltable formulation can be, in certain embodiments, described as capable of providing a smooth and creamy sensation when in the mouth of the user (rather than a slick, waxy or slimy sensation). A lozenge-type formulation generally is hard in texture and exhibits a dissolvable quality. A chewable formulation generally exhibits a chewiness that is between that of a pastille as described herein and a gum. Like a pastille, a chewable formulation typically exhibits cohesiveness to withstand light chewing action in the oral cavity, but typically disintegrates at a slower rate than a pastille, allowing for more chewing action prior to complete disintegration of the composition. A hard coating-type formulation generally provides some sense of crunchiness or crispness.

The structure and makeup of the formulations within a given multi-layered smokeless tobacco product can vary. In certain embodiments, 2-component and 3-component smokeless tobacco products are provided as shown in Table 1, where the Core may refer to the innermost component of a coated formulation and Layer 1 and Layer 2 are layers applied consecutively to the core formulation. The core may alternatively refer to one component of a side-by-side-type configuration, where Layer 1 is applied such that it is adhered to the Core formulation on at least one surface and Layer 2, where present, is adhered to the Layer 1 formulation on at least one surface.

Table 1 describes various combinations of formulations that may comprise multi-layered smokeless tobacco products. Depending on the specific composition of each formulation, Table 1 represents exemplary products of the present invention having different combinations of different formulations. Each formulation provided in Table 1 is preferably a formulation having a specific composition as described herein.

TABLE 1

Representative Smokeless Tobacco Product Compositions

| Core formulation | Layer 1 formulation | Layer 2 formulation |
|---|---|---|
| Meltable-type | Lozenge-type | None |
| Meltable-type | Starch molded-type | None |
| Meltable-type | Injection molded-type | None |
| Meltable-type | Chewable-type | None |
| Meltable-type | Hard coating-type | None |
| Lozenge-type | Meltable-type | None |
| Lozenge-type | Starch molded-type | None |
| Lozenge-type | Injection molded-type | None |
| Lozenge-type | Chewable-type | None |
| Lozenge-type | Hard coating-type | None |
| Starch molded-type | Meltable-type | None |
| Starch molded-type | Lozenge-type | None |
| Starch molded-type | Injection molded-type | None |
| Starch molded-type | Chewable-type | None |
| Starch-molded type | Hard coating-type | None |
| Injection molded-type | Meltable-type | None |
| Injection molded-type | Lozenge-type | None |
| Injection molded-type | Starch molded-type | None |
| Injection molded-type | Chewable-type | None |
| Injection molded-type | Hard coating-type | None |
| Chewable-type | Lozenge-type | None |
| Chewable-type | Meltable-type | None |
| Chewable-type | Starch molded-type | None |
| Chewable-type | Injection molded-type | None |
| Chewable-type | Hard coating-type | None |
| Hard coating-type | Lozenge-type | None |
| Hard coating-type | Meltable-type | None |
| Hard coating-type | Starch molded-type | None |
| Hard coating-type | Injection molded-type | None |
| Hard coating-type | Chewable-type | None |
| Meltable-type | Lozenge-type | Meltable-type |
| Meltable-type | Lozenge-type | Injection molded-type |
| Meltable-type | Lozenge-type | Starch molded-type |
| Meltable-type | Lozenge-type | Chewable-type |
| Meltable-type | Lozenge-type | Hard coating-type |
| Meltable-type | Starch molded-type | Meltable-type |
| Meltable-type | Starch molded-type | Lozenge-type |
| Meltable-type | Starch molded-type | Injection molded-type |
| Meltable-type | Starch molded-type | Chewable-type |
| Meltable-type | Starch molded-type | Hard coating-type |
| Meltable-type | Injection molded-type | Meltable-type |
| Meltable-type | Injection molded-type | Lozenge-type |
| Meltable-type | Injection molded-type | Starch molded-type |
| Meltable-type | Injection molded-type | Chewable-type |
| Meltable-type | Injection molded-type | Hard coating-type |
| Meltable-type | Chewable-type | Meltable-type |
| Meltable-type | Chewable-type | Lozenge-type |
| Meltable-type | Chewable-type | Starch molded-type |
| Meltable-type | Chewable-type | Injection molded-type |
| Meltable-type | Chewable-type | Hard coating-type |
| Meltable-type | Hard coating-type | Meltable-type |
| Meltable-type | Hard coating-type | Lozenge-type |
| Meltable-type | Hard coating-type | Starch molded-type |
| Meltable-type | Hard coating-type | Injection molded-type |
| Meltable-type | Hard coating-type | Chewable-type |
| Lozenge-type | Meltable-type | Lozenge-type |
| Lozenge-type | Meltable-type | Starch molded-type |
| Lozenge-type | Meltable-type | Injection molded-type |
| Lozenge-type | Meltable-type | Chewable-type |
| Lozenge-type | Meltable-type | Hard coating-type |
| Lozenge-type | Starch molded-type | Meltable-type |
| Lozenge-type | Starch molded-type | Lozenge-type |
| Lozenge-type | Starch molded-type | Injection molded-type |
| Lozenge-type | Starch molded-type | Chewable-type |
| Lozenge-type | Starch molded-type | Hard coating-type |

TABLE 1-continued

Representative Smokeless Tobacco Product Compositions

| Core formulation | Layer 1 formulation | Layer 2 formulation |
| --- | --- | --- |
| Lozenge-type | Injection molded-type | Lozenge-type |
| Lozenge-type | Injection molded-type | Meltable-type |
| Lozenge-type | Injection molded-type | Starch molded-type |
| Lozenge-type | Injection molded-type | Chewable-type |
| Lozenge-type | Injection molded-type | Hard coating-type |
| Lozenge-type | Chewable-type | Lozenge-type |
| Lozenge-type | Chewable-type | Meltable-type |
| Lozenge-type | Chewable-type | Injection molded-type |
| Lozenge-type | Chewable-type | Starch molded-type |
| Lozenge-type | Chewable-type | Hard coating-type |
| Lozenge-type | Hard coating-type | Lozenge-type |
| Lozenge-type | Hard coating-type | Meltable-type |
| Lozenge-type | Hard coating-type | Injection molded-type |
| Lozenge-type | Hard coating-type | Starch molded-type |
| Lozenge-type | Hard coating-type | Chewable-type |
| Starch molded-type | Meltable-type | Lozenge-type |
| Starch molded-type | Meltable-type | Injection molded-type |
| Starch molded-type | Meltable-type | Starch molded-type |
| Starch molded-type | Meltable-type | Chewable-type |
| Starch molded-type | Meltable-type | Hard coating-type |
| Starch molded-type | Lozenge-type | Meltable-type |
| Starch molded-type | Lozenge-type | Starch molded-type |
| Starch molded-type | Lozenge-type | Injection molded-type |
| Starch molded-type | Lozenge-type | Chewable-type |
| Starch molded-type | Lozenge-type | Hard coating-type |
| Starch molded-type | Injection molded-type | Meltable-type |
| Starch molded-type | Injection molded-type | Lozenge-type |
| Starch molded-type | Injection molded-type | Starch molded-type |
| Starch molded-type | Injection molded-type | Chewable-type |
| Starch molded-type | Injection molded-type | Hard coating-type |
| Starch molded-type | Chewable-type | Lozenge-type |
| Starch molded-type | Chewable-type | Meltable-type |
| Starch molded-type | Chewable-type | Starch molded-type |
| Starch molded-type | Chewable-type | Injection molded-type |
| Starch molded-type | Chewable-type | Hard coating-type |
| Starch molded-type | Hard coating-type | Lozenge-type |
| Starch molded-type | Hard coating-type | Meltable-type |
| Starch molded-type | Hard coating-type | Starch molded-type |
| Starch molded-type | Hard coating-type | Injection molded-type |
| Starch molded-type | Hard coating-type | Chewable-type |
| Injection molded-type | Meltable-type | Lozenge-type |
| Injection molded-type | Meltable-type | Injection molded-type |
| Injection molded-type | Meltable-type | Starch molded-type |
| Injection molded-type | Meltable-type | Chewable-type |
| Injection molded-type | Meltable-type | Hard coating-type |
| Injection molded-type | Lozenge-type | Meltable-type |
| Injection molded-type | Lozenge-type | Injection molded-type |
| Injection molded-type | Lozenge-type | Starch molded-type |
| Injection molded-type | Lozenge-type | Chewable-type |
| Injection molded-type | Lozenge-type | Hard coating-type |
| Injection molded-type | Starch molded-type | Lozenge-type |
| Injection molded-type | Starch molded-type | Meltable-type |
| Injection molded-type | Starch molded-type | Injection molded-type |
| Injection molded-type | Starch molded-type | Chewable-type |
| Injection molded-type | Starch molded-type | Hard coating-type |
| Injection molded-type | Chewable-type | Lozenge-type |
| Injection molded-type | Chewable-type | Meltable-type |
| Injection molded-type | Chewable-type | Starch molded-type |
| Injection molded-type | Chewable-type | Injection molded-type |
| Injection molded-type | Chewable-type | Hard coating-type |
| Injection molded-type | Hard coating-type | Lozenge-type |
| Injection molded-type | Hard coating-type | Meltable-type |
| Injection molded-type | Hard coating-type | Starch molded-type |
| Injection molded-type | Hard coating-type | Injection molded-type |
| Injection molded-type | Hard coating-type | Chewable-type |
| Chewable-type | Lozenge-type | Meltable-type |
| Chewable-type | Lozenge-type | Starch molded-type |
| Chewable-type | Lozenge-type | Injection molded-type |
| Chewable-type | Lozenge-type | Chewable-type |
| Chewable-type | Lozenge-type | Hard coating-type |
| Chewable-type | Meltable-type | Lozenge-type |
| Chewable-type | Meltable-type | Starch molded-type |
| Chewable-type | Meltable-type | Injection molded-type |
| Chewable-type | Meltable-type | Chewable-type |
| Chewable-type | Meltable-type | Hard coating-type |
| Chewable-type | Starch molded-type | Lozenge-type |
| Chewable-type | Starch molded-type | Meltable-type |
| Chewable-type | Starch molded-type | Injection molded-type |
| Chewable-type | Starch molded-type | Chewable-type |
| Chewable-type | Starch molded-type | Hard coating-type |
| Chewable-type | Injection molded-type | Lozenge-type |
| Chewable-type | Injection molded-type | Meltable-type |
| Chewable-type | Injection molded-type | Starch molded-type |
| Chewable-type | Injection molded-type | Chewable-type |
| Chewable-type | Injection molded-type | Hard coating-type |
| Chewable-type | Hard coating-type | Lozenge-type |
| Chewable-type | Hard coating-type | Meltable-type |
| Chewable-type | Hard coating-type | Starch molded-type |
| Chewable-type | Hard coating-type | Injection molded-type |
| Chewable-type | Hard coating-type | Chewable-type |
| Hard coating-type | Lozenge-type | Meltable-type |
| Hard coating-type | Lozenge-type | Starch molded-type |
| Hard coating-type | Lozenge-type | Injection molded-type |
| Hard coating-type | Lozenge-type | Chewable-type |
| Hard coating-type | Lozenge-type | Hard coating-type |
| Hard coating-type | Meltable-type | Lozenge-type |
| Hard coating-type | Meltable-type | Starch molded-type |
| Hard coating-type | Meltable-type | Injection molded-type |
| Hard coating-type | Meltable-type | Chewable-type |
| Hard coating-type | Meltable-type | Hard coating-type |
| Hard coating-type | Starch molded-type | Lozenge-type |
| Hard coating-type | Starch molded-type | Meltable-type |
| Hard coating-type | Starch molded-type | Injection molded-type |
| Hard coating-type | Starch molded-type | Chewable-type |
| Hard coating-type | Starch molded-type | Hard coating-type |
| Hard coating-type | Injection molded-type | Lozenge-type |
| Hard coating-type | Injection molded-type | Meltable-type |
| Hard coating-type | Injection molded-type | Starch molded-type |
| Hard coating-type | Injection molded-type | Chewable-type |
| Hard coating-type | Injection molded-type | Hard coating-type |
| Hard coating-type | Chewable-type | Lozenge-type |
| Hard coating-type | Chewable-type | Meltable-type |
| Hard coating-type | Chewable-type | Starch molded-type |
| Hard coating-type | Chewable-type | Injection molded-type |
| Hard coating-type | Chewable-type | Hard coating-type |

Smokeless tobacco products according to the present invention are advantageous in that they are capable of exhibiting various mixtures of organoleptic properties. In certain embodiments, because such smokeless tobacco products are multi-layered. they can provide the user with a range of organoleptic sensations during use of the product. For example, smokeless tobacco products can be tailored to exhibit a certain range of organoleptic properties in a desired order of experience (e.g., an initial hard, dissolvable sensation followed by a chewy sensation).

Due to the multi-layered structure of the smokeless tobacco products of the present invention, it is possible in certain embodiments to tailor the tobacco flavor and/or tobacco component release profile of the product as a whole. In other words, the manner and/or rate at which the tobacco components are released can vary. Certain types of formulations typically exhibit faster or slower release of active ingredients (e.g., nicotine). Such formulations can advantageously be positioned within the multi-layered structure of the smokeless tobacco product such that the product exhibits a desired release profile. For example, in one specific embodiment, the exterior formulation comprises a formulation that exhibits relatively fast release of active ingredients, whereas the one or more internal formulations exhibit a more extended release profile, providing a product that provides both a fast initial release of active ingredients and an extended release of active ingredients. In certain embodiments, different flavorants and/or other components (e.g., sensates) can be incorporated within certain layers. Varying the flavors and/or organoleptic sensations of the different layers can provide the user with a unique range of taste and/or sensory experiences over the course of use of the product.

Representative multi-layered smokeless tobacco products according to the present invention can have various types of formats and configurations, and as a result, the character, nature, behavior, consistency, shape, form, size and weight of the composition can vary. The shape of a representative composition can be generally spherical, cylindrical (e.g., ranging form the general shape of a flattened disc to the general shape of a relatively long, slender stick), helical, obloid, square, rectangular, or the like; or the composition can have the form of a bead, granular powder, crystalline powder, capsule, film, strip, gel, or the like. The shape of the composition can resemble a wide variety of pill, tablet, lozenge, capsule, and caplet types of products.

The means by which multi-layered smokeless tobacco products can be produced can vary. Generally, the core formulation can be provided by any means for providing such a formulation. Exemplary means for providing certain types of formulations are provided herein, although it is noted that other methods can be used without departing from the present invention. Typically, the core formulation is produced and the one or more additional layers are applied thereto. The core can be formed, for example, into the desired shape by pouring the formulation mixture directly into molds, forming (e.g., rolling or pressing) into the desired shape, or extruding. In some embodiments, the mixture can be extruded, starch molded, or injection molded.

In certain embodiments, the method by which the one or more additional layers are formed may require some degree of tailoring so as to accommodate application of the formulation onto the core or previous layer of the smokeless tobacco product. For example, second and subsequent layers of the smokeless tobacco products are often applied by means of coatings (e.g., by dip coating, spray coating, or preparing a separate sheet of the formulation that can be used to enwrap the core formulation or to adhere to one or more surface of the core formulation, as in a side-by-side type configuration).

Typical conditions associated with manufacture of food grade products such as described herein include control of heat and temperature (i.e., the degree of heat to which the various ingredients are exposed during manufacture and the temperature of the manufacturing environment), moisture content (e.g., the degree of moisture present within individual ingredients and within the final composition), humidity within the manufacturing environment, atmospheric control (e.g., nitrogen atmosphere), airflow experienced by the various ingredients during the manufacturing process, and other similar types of factors. Additionally, various process steps involved in product manufacture can involve selection of certain solvents and processing aids, use of heat and radiation, refrigeration and cryogenic conditions, ingredient mixing rates, and the like. The manufacturing conditions also can be controlled due to selection of the form of various ingredients (e.g., solid, liquid, or gas), particle size or crystalline nature of ingredients of solid form, concentration of ingredients in liquid form, or the like. Ingredients can be processed into the desired composition by techniques such as extrusion, compression, spraying, and the like.

Meltable-type formulations can, in certain embodiments, be prepared by combining the components (e.g., a tobacco material and additional components) with a melted lipid, and forming a molten smokeless tobacco composition slurry, which can then be deposited into a mold or coated onto another formulation.

Lozenge-type formulations may, in certain embodiments, be prepared by heating a mixture of ingredients comprising a high percentage of isomalt to about 143° C. Once all components are dissolved, the temperature is raised past the hard crack stage (e.g., to about 166° C.) and then removed from the heat to allow the mixture to cool. Various components can be added at certain stages (e.g., they may be added to the isomalt mixture at room temperature, may be added when the mixture reaches 143° C. or 166° C. or may be added at a given temperature during the cooling process).

Injection molded-type formulations can, in certain embodiments, be prepared by mixing the components (e.g., a tobacco material, binder, and polysaccharide filler component) to form a smokeless tobacco mixture; injection molding the smokeless tobacco mixture (e.g., by compressing the smokeless tobacco mixture using a compressive force of at least about 75,000 kPa or at least about 100,000 kPa); and cooling the smokeless tobacco mixture to form a solidified smokeless tobacco formulation (e.g., cooling to a temperature of about 20° C. to about 25° C.).

The means by which the formulations are prepared can vary and certain methods of making certain formulation types may have to be adapted, depending upon the makeup of a given smokeless tobacco product. For example, where an outer layer comprises a formulation that is traditionally molded, the method may require modification such that that the formulation can be coated onto another formulation. For example, such formulations can be capable of being wet- or dry-sprayed onto another surface or applied to another surface by dipping that surface into the formulation. Depending on the nature of the formulation, the method of application may require modification of traditional spray coating techniques. For example, to spray coat a lozenge-type formulation onto another formulation, it may be necessary to maintain the formulation and the spray coating equipment at an elevated temperature during the process. In certain embodiments, temperature control is important to avoid altering the nature of other formulations. For example, care must be taken to avoid melting a meltable-type formulation in the core of a smokeless tobacco product during the application of an additional layer.

In certain embodiments, the smokeless tobacco product is transparent or translucent as defined herein. Transparency/translucency can be determined by any means commonly used in the art; however, it is commonly measured by spectrophotometric light transmission over a range of wavelengths (e.g., from about 400-700 nm). Transmission measurements for the smokeless tobacco products of the present invention are typically higher than those of traditional tobacco-extract containing smokeless tobacco products. Translucency can also be confirmed by visual inspection by simply holding the smokeless tobacco product up to a light source and determining if light travels through the product in a diffuse manner.

Aspects of the present invention are more fully illustrated by the following examples, which are set forth to illustrate certain aspects of the present invention and are not to be construed as limiting thereof.

EXPERIMENTALS

Example 1: Preparation of Lozenge-Type Formulations a) Preparation with No Heat Treatment A smokeless tobacco formulation suitable for use as a lozenge-type component of a smokeless tobacco product for oral use is provided in the following manner. Isomalt, NaCl, and vanillin are mixed in a pot and the temperature of the mixture is brought to 143° C. The mixture is held at 143° C. until the isomalt is melted and the temperature is then increased to 166° C. In a separate vessel, ultrafiltered tobacco extract (as prepared, for example, according to the methods provided in U.S. patent application Ser. No. 13/240,525 to Holton, filed on Sep. 22, 2011, which is incorporated herein by reference), maltitol syrup, $H_2O$, sucralose, and, optionally, L-lysine are mixed to form a solution. Optionally, in a second separate vessel, water and sodium hydroxide are mixed to form a solution.

The isomalt mixture is removed from the heat and allowed to cool to 132° C. The remaining components (i.e., the extract containing solution and optional sodium hydroxide solution) are combined and, optionally, one or more flavorings are added to the combined solution. The combined solution is poured into the hot isomalt mixture and folded in.

The resulting mixture is poured into molds. When the mixture becomes too viscous to pour, the mixture can be heated in a microwave using high heat (e.g., for about 7 seconds). Representative smokeless tobacco formulation mixtures are set forth below. Mixture 1 below contains no base, while Mixtures 2 and 3 contain sodium hydroxide at varying levels.

| MIXTURE 1 | |
|---|---|
| Ingredient | Percent by weight |
| Isomalt ST-M* | 90.37 |
| Maltitol syrup | 1.00 |
| Ultrafiltered tobacco extract (77% solids) | 3.84 |
| NaCl | 1.00 |
| Vanillin | 0.30 |
| Sucralose | 0.20 |
| $H_2O$ | 3.16 |
| Flavorant | 0.13 |

Final pH = 4.5
*Isomalt in which 1,6-GPS and 1,1-GPM are present in essentially equimolar amounts and which has a medium grain size, the diameter of approximately 90% of all particles being <3 mm.

| MIXTURE 2 | |
|---|---|
| Ingredient | Percent by weight |
| Isomalt ST-M | 90.37 |
| Maltitol syrup | 1.00 |
| Ultrafiltered tobacco extract (77% solids) | 3.84 |
| NaCl | 1.00 |
| Vanillin | 0.30 |
| Sucralose | 0.20 |
| $H_2O$ | 3.01 |
| Flavorant | 0.13 |
| NaOH | 0.15 |

Final pH = 6.6

| MIXTURE 3 | |
|---|---|
| Ingredient | Percent by weight |
| Isomalt ST-M | 90.37 |
| Maltitol syrup | 1.00 |
| Ultrafiltered tobacco extract (77% solids) | 3.84 |
| NaCl | 1.00 |
| Vanillin | 0.30 |
| Sucralose | 0.20 |
| $H_2O$ | 2.86 |
| Flavorant | 0.13 |
| NaOH | 0.30 |

Final pH = 8.1 b) Preparation Including Heat Treatment of Tobacco Extract

A smokeless tobacco formulation suitable for use as a lozenge-type component of a smokeless tobacco product for oral use is provided in the following manner. Certain smokeless tobacco products are prepared using tobacco extract that has been heat treated with different additives to reduce the amount of acrylamide. A heat-treated tobacco extract is prepared by combining an ultrafiltered tobacco extract with an additive to reduce acrylamide in water and stirring until a solution is formed. The resulting mixture is heated to 88° C. and held at this temperature for 60 minutes. The mixture is cooled and additional water is added to return the mixture to the starting weight of 200 g.

Mixtures 4-7, described in the tables below, relate to smokeless tobacco formulations comprising heat-treated tobacco extract prepared in this way. Part A outlines the components of the heat treatment process. The mixtures comprise different reagents for the reduction of acrylamide. The resulting heat-treated tobacco extract can be stored frozen until use. This heat-treated tobacco extract is used in the preparation of a smokeless tobacco formulation according to the method provided above, using the components detailed in Part B of Mixtures 4-7.

As one specific example, heat-treated tobacco extract is prepared by combining $H_2O$ (65.79 g), treated tobacco extract, 77% solids (118.42 g), NaOH (8.90 g), and L-lysine (6.89 g), stirring until dissolved, heating to 88° C., and holding at this temperature for 60 minutes. The mixture is cooled to 29° C. and additional $H_2O$ is added to return the mixture to the starting weight of 200 g.

| MIXTURE 4 | |
|---|---|
| Part A - Extract Treatment with NaOH and L-lysine | |
| Ingredient | Grams |
| Ultrafiltered tobacco extract (77% solids) | 118.42 |
| $H_2O$ | 65.79 |
| NaOH | 8.50 |
| L-lysine | 7.29 |
| Part B - Preparation of Smokeless Tobacco Product | |
| Ingredient | Percent by weight |
| Isomalt ST-M | 90.00 |
| Maltitol syrup | 1.00 |
| Heat-treated tobacco extract | 7.60 |
| NaCl | 1.00 |
| Vanillin | 0.10 |
| Sucralose | 0.15 |
| Flavorant | 0.15 |

Final pH = 7.76

MIXTURE 5

Part A - Extract Treatment with NaOH and L-cysteine 97%

| Ingredient | Grams |
| --- | --- |
| Ultrafiltered tobacco extract (77% solids) | 118.42 |
| H₂O | 65.79 |
| NaOH | 8.50 |
| L-cysteine 97% | 7.29 |

Part B - Preparation of Smokeless Tobacco Product

| Ingredient | Percent by weight |
| --- | --- |
| Isomalt ST-M | 90.00 |
| Maltitol syrup | 1.00 |
| Heat-treated tobacco extract | 7.60 |
| NaCl | 1.00 |
| Vanillin | 0.10 |
| Sucralose | 0.15 |
| Flavorant | 0.15 |

Final pH = 7.86

MIXTURE 6

Part A - Extract Treatment with NaOH and Asparaginase

| Ingredient | Grams |
| --- | --- |
| Ultrafiltered tobacco extract (77% solids) | 118.42 |
| H₂O | 65.79 |
| NaOH | 8.50 |
| Asparaginase | 1.50 |

Part B - Preparation of Smokeless Tobacco Product

| Ingredient | Percent by weight |
| --- | --- |
| Isomalt ST-M | 90.00 |
| Maltitol syrup | 1.00 |
| Heat-treated tobacco extract | 7.60 |
| NaCl | 1.00 |
| Vanillin | 0.10 |
| Sucralose | 0.15 |
| Flavorant | 0.15 |

Final pH = 8.29

MIXTURE 7

Part A - Extract Treatment with NaOH and 3% Hydrogen Peroxide

| Ingredient | Grams |
| --- | --- |
| Ultrafiltered tobacco extract (77% solids) | 118.42 |
| NaOH 50% solution | 17.00 |
| 3% hydrogen peroxide solution | 80.00 |

Part B - Preparation of Smokeless Tobacco Product

| Ingredient | Percent by weight |
| --- | --- |
| Isomalt ST-M | 90.00 |
| Maltitol syrup | 1.00 |
| Heat-treated tobacco extract | 7.60 |
| NaCl | 1.00 |
| Vanillin | 0.10 |
| Sucralose | 0.15 |
| Flavorant | 0.15 |

Final pH = 8.10

The compositions comprising heat-treated tobacco extract exhibited relatively low acrylamide levels in the final smokeless tobacco products (Mixture 4=343 ng/g, Mixture 5=44.8 ng/g, Mixture 6=190 ng/g, and Mixture 7=445 ng/g). These acrylamide levels represent a significant decrease as compared with tobacco extract that has not been heat treated. For example, heat treated tobacco extract can exhibit up to about a 98% reduction in acrylamide level over non-heat-treated tobacco extract. The values for smokeless tobacco products represented by Mixtures 4-7 represent a reduction in acrylamide level of from about 60% to about 96% over a comparable smokeless tobacco product wherein the tobacco extract has not been heat treated. For other exemplary lozenge-type formulations, see U.S. patent application Ser. No. 13/240,525 to Holton, filed on Sep. 22, 2011, which is incorporated herein by reference.

Example 2: Preparation of Meltable-Type Formulations a) Meltable Formulation 1

A smokeless tobacco formulation suitable for use as a meltable component of a smokeless tobacco product for oral use is provided in the following manner. A tobacco material having tobacco particles with an average particle size of about 30 microns is provided. The tobacco material is dried in open atmosphere at about 54° C. to reduce the moisture content from about 50 percent to less than about 10 percent. Various dry ingredients are provided, which include a filler (isomalt), a salt (sodium chloride), a sweetener (sucralose), and flavorants (vanillin, spray-dried peppermint, spray-dried menthol). All dry ingredients, in powder form, as well the dried tobacco material, are added together and thoroughly mixed in a Hobart mixer with a paddle for about three minutes at about 120 rpm.

A lipid substance having a melting point of about 38° C. to about 42° C. is provided (available as 108-24-B from AarhusKarlshamn USA Inc.). The lipid substance is a non-hydrogenated lauric coating fat containing a blend of palm kernel oil and palm oil. The lipid substance is melted in a mixing vessel. While maintaining heat to the mixing vessel having the melted lipid substance, the mixed dry formulation is added while mixing occurs, thereby creating a flowable slurry of smokeless tobacco composition having a moisture content of less than about 10 percent. The slurry is deposited in a mold to achieve about 1 gram weight per piece of smokeless tobacco product. The slurry is allowed to harden by ambient air drying for about 45 minutes, after which the individual pieces of meltable smokeless tobacco formulation are removed from the mold. The mixture of the smokeless tobacco composition is about 34 parts lipid substance, 25.5 parts filler, 36 parts tobacco material, 0.5 parts salt, 0.45 parts sweetener, and 3.55 parts flavorant.

b) Meltable Formulation 2

A smokeless tobacco formulation suitable for use as a meltable component of a smokeless tobacco product for oral use is provided in the following manner. A tobacco material having tobacco particles with an average particle size of about 30 microns is provided. The tobacco material is dried in open atmosphere at about 54° C. to reduce the moisture content from about 50 percent to less than about 10 percent. Various dry ingredients are provided, which include a filler (isomalt), a salt (sodium chloride), a sweetener (sucralose), and flavorants (vanillin, spray-dried peppermint, spray-dried menthol). All dry ingredients, in powder form, as well as the dried tobacco material, are added together and thoroughly mixed in a Hobart mixer with a paddle for about three minutes at about 120 rpm.

A lipid substance having a melting point of about 38° C. to about 42° C. is provided (available as 108-24-B from AarhusKarlshamn USA Inc.). The lipid substance is a non-hydrogenated lauric coating fat containing a blend of palm kernel oil and palm oil. The lipid substance is melted in a mixing vessel. While maintaining heat to the mixing vessel having the melted lipid substance, the mixed dry formulation is added while mixing occurs, thereby creating a flowable slurry of smokeless tobacco composition having a moisture content of less than about 10 percent. The slurry is deposited in a mold to achieve about 1 gram weight per piece of smokeless tobacco product. The slurry is allowed to harden by ambient air drying for about 45 minutes, after which the individual pieces of meltable smokeless tobacco formulation are removed from the mold. The mixture of the smokeless tobacco composition is about 34 parts lipid substance, 24.5 parts filler, 36 parts tobacco material, 0.5 parts salt, 0.45 parts sweetener, and 4.55 parts flavorant.

c) Meltable Formulation 3

A smokeless tobacco formulation suitable for use as a meltable component of a smokeless tobacco product for oral use is provided in the following manner. A tobacco material having tobacco particles with an average particle size of about 30 microns is provided. The tobacco material is dried in open atmosphere at about 54° C. to reduce the moisture content from about 50 percent to less than about 10 percent. Various dry ingredients are provided, which include a filler (isomalt), a salt (sodium chloride), a sweetener (sucralose), and flavorants (vanillin, spray-dried peppermint, spray-dried menthol). All dry ingredients, in powder form, as well as the dried tobacco material, are added together and thoroughly mixed in a Hobart mixer with a paddle for about three minutes at about 120 rpm.

A lipid substance having a melting point of about 38° C. to about 42° C. is provided (available as 108-24-B from AarhusKarlshamn USA Inc.). The lipid substance is a non-hydrogenated lauric coating fat containing a blend of palm kernel oil and palm oil. The lipid substance is melted in a mixing vessel. While maintaining heat to the mixing vessel having the melted lipid substance, the mixed dry formulation is added while mixing occurs, thereby creating a flowable slurry of smokeless tobacco composition having a moisture content of less than about 10 percent. The slurry is deposited in a mold to achieve about 1 gram weight per piece of smokeless tobacco product. The slurry is allowed to harden by ambient air drying for about 45 minutes, after which the individual pieces of meltable smokeless tobacco formulation are removed from the mold. The mixture of the smokeless tobacco composition is about 34 parts lipid substance, 23.5 parts filler, 36 parts tobacco material, 0.5 parts salt, 0.45 parts sweetener, and 5.55 parts flavorant.

d) Meltable Formulation 4

A smokeless tobacco formulation suitable for use as a meltable component of a smokeless tobacco product for oral use is provided in the following manner. A tobacco material having tobacco particles with an average particle size of about 30 microns is provided. The tobacco material is dried at about 54° C. for about 24 hours to reduce the moisture content from about 50 percent to less than about 3 percent. Various dry ingredients are provided, which include a filler (isomalt), a sweetener (sucralose), and a flavorant (vanillin). All dry ingredients, in powder form, as well as the dried tobacco material, are added together and thoroughly mixed in a Hobart mixer with a paddle for about three minutes at about 120 rpm.

A lipid substance having a melting point of about 38° C. to about 42° C. is provided (available as 108-24-B from AarhusKarlshamn USA Inc.). The lipid substance is a non-hydrogenated lauric coating fat containing palm kernel oil and palm oil. The lipid substance is melted in a mixing vessel. While maintaining heat to the mixing vessel having the melted lipid substance, the mixed dry formulation is added while mixing occurs, thereby creating a flowable slurry of smokeless tobacco composition having a moisture content of less than about 10 percent. The slurry is deposited in a mold to achieve about 1 gram weight per piece of smokeless tobacco product. The slurry is allowed to harden by ambient air drying for about 45 minutes, after which the individual pieces of smokeless tobacco formulation are removed from the mold. The mixture of the smokeless tobacco composition is about 34.21 parts lipid substance, 29.79 parts filler, 35.51 parts tobacco material, 0.45 parts sweetener, and 0.04 parts flavorant.

e) Meltable Formulation 5

A smokeless tobacco formulation suitable for use as a meltable component of a smokeless tobacco product for oral use is provided in the following manner. A tobacco material having tobacco particles with an average particle size of about 30 microns is provided. The tobacco material is dried in open atmosphere at about 54° C. to reduce the moisture content from about 50 percent to less than about 10 percent. Various dry ingredients are provided, which include a filler (isomalt), additives (sodium chloride, flour), a sweetener (sucralose), and a flavorant (vanillin). All dry ingredients, in powder form, as well as the dried tobacco material, are added together and thoroughly mixed in a Hobart mixer with a paddle for about three minutes at about 120 rpm.

A lipid substance having a melting point of about 38° C. to about 42° C. is provided (available as 108-24-B from AarhusKarlshamn USA Inc.). The lipid substance is a non-hydrogenated lauric coating fat containing palm kernel oil and palm oil. The lipid substance is melted in a mixing vessel. While maintaining heat to the mixing vessel having the melted lipid substance, the mixed dry formulation is added while mixing occurs, thereby creating a flowable slurry of smokeless tobacco composition having a moisture content of less than about 10 percent. The slurry is deposited in a mold to achieve about 1 gram weight per piece of smokeless tobacco product. The slurry is allowed to harden by ambient air drying for about 45 minutes, after which the individual pieces of smokeless tobacco formulation are removed from the mold. The mixture of the smokeless tobacco composition is about 34 parts lipid substance, 29 parts filler, 36 parts tobacco material, 0.5 parts additive, 0.45 parts sweetener, and 0.05 parts flavorant.

f) Meltable Formulation 6

A smokeless tobacco formulation suitable for use as a meltable component of a smokeless tobacco product for oral use is provided in the following manner. A tobacco material having tobacco particles with an average particle size of about 30 microns is provided. The tobacco material is dried in open atmosphere at about 54° C. to reduce the moisture content from about 50 percent to less than about 10 percent. Various dry ingredients are provided, which include a filler (isomalt), additives (sodium chloride, flour), a sweetener (sucralose), and a flavorant (vanillin). All dry ingredients, in powder form, as well as the dried tobacco material, are added together and thoroughly mixed in a Hobart mixer with a paddle for about three minutes at about 120 rpm.

A lipid substance having a melting point of about 39° C. to about 41° C. is provided (available as 108-48-B from AarhusKarlshamn USA Inc.). The lipid substance is non-hydrogenated lauric coating fat containing palm kernel oil and palm oil.

The lipid substance is melted in a mixing vessel. While maintaining heat to the mixing vessel having the melted lipid substance, the mixed dry formulation is added while mixing occurs, thereby creating a flowable slurry of smokeless tobacco composition having a moisture content of less than about 10 percent. The slurry is deposited in a mold to achieve about 1 gram weight per piece of smokeless tobacco product. The slurry is allowed to harden by ambient air drying for about 45 minutes, after which the individual pieces of smokeless tobacco product are removed from the mold. The mixture of the smokeless tobacco composition is about 34 parts lipid substance, 29 parts filler, 36 parts tobacco material, 0.5 parts additive, 0.45 parts sweetener, and 0.05 parts flavorant.

g) Meltable Formulation 7

A smokeless tobacco formulation suitable for use as a meltable component of a smokeless tobacco product for oral use is provided in the following manner. A tobacco material in the form of an aqueous tobacco extract (extract of a tobacco mixture comprising 75% by weight flue-cured tobacco and 25% by weight burley tobacco) is heat-treated in the presence of lysine and spray-dried. Various dry ingredients are provided, which include a filler (isomalt), a salt (sodium chloride), a sweetener (sucralose), and two flavorants (vanillin and mint). All dry ingredients, in powder form, as well as the spray-dried tobacco material, are added together and thoroughly mixed in a Hobart mixer with a paddle for about three minutes at about 120 rpm.

A lipid substance having a melting point of about 38° C. to about 42° C. is provided (available as 108-24-B from AarhusKarlshamn USA Inc.). The lipid substance is a non-hydrogenated lauric coating fat containing palm kernel oil and palm oil. The lipid substance is melted in a mixing vessel using a microwave. The melted lipid is slowly added to the dry blend while stirring. While maintaining heat to the mixing vessel, addition of the entire melted lipid component creates a flowable slurry of smokeless tobacco composition. The slurry is deposited in a mold to achieve about 1 gram weight per piece of smokeless tobacco product. The slurry is allowed to harden by ambient air drying for about 45 minutes, after which the individual pieces of smokeless tobacco formulation are removed from the mold. The mixture of the smokeless tobacco composition is about 40 parts lipid substance, 56 parts filler, 2 parts tobacco extract, 0.5 parts salt, 0.45 parts sweetener, and 1.05 parts flavorant.

h) Meltable Formulation 8

A smokeless tobacco formulation suitable for use as a meltable component of a smokeless tobacco product for oral use is provided in the following manner. A composition is prepared as described in the previous meltable formulation, except the heat-treated tobacco extract is first mixed with an extender component selected from maltodextrin, cyclodextrin, and gum arabic prior to spray-drying. The amount of extender added to the liquid extract is the amount sufficient to raise the solids content of the liquid extract to about 20% by weight. The resulting mixture is spray-dried to form a particulate composition with greater density and improved flowability, which enhances the mixing properties of the powder material. The final spray-dried powder has a weight ratio of tobacco extract to extender ingredient of about 3:1. The spray-dried powder is used in place of the tobacco extract component as described in Example 34, although the amount of spray-dried material is increased such that the spray-dried tobacco extract composition is present in an amount of about 2.5 parts by weight in the final smokeless tobacco composition, and the lipid component is reduced to 39.5 parts by weight.

For other exemplary meltable-type formulations, see U.S. patent application Ser. No. 13/330,929, filed Dec. 20, 2011 to Cantrell et al., which is incorporated herein by reference.

Example 3: Preparation of Starch Molded-Type Formulations (Pastilles)

a) Starch Molded Formulation 1

A smokeless tobacco formulation suitable for use as a starch molded component of a smokeless tobacco product for oral use is provided in the following manner. An aqueous mixture is prepared. The aqueous mixture is formed by hydrating a binder material (gum arabic) with water and then admixing the hydrated gum with a filler (isomalt), an additional filler (maltitol; available as LYCASIN from Roquette Freres S.A.), and a salt using a high shear mixer. The aqueous mixture is about 33 parts binder material, 29 parts isomalt, 4.1 parts maltitol, 2 parts salt, and 33 parts water.

The aqueous mixture is mixed with a sweetener (sucralose) and a tobacco material in a Hobart mixing bowl to form a smokeless tobacco composition. The mixture of the smokeless tobacco composition is about 74.5 parts aqueous mixture, 25 parts tobacco material, and 0.5 parts sucralose.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

b) Starch Molded Formulation 2

A smokeless tobacco formulation suitable for use as a starch molded component of a smokeless tobacco product for oral use is provided in the following manner. An aqueous mixture is prepared. The aqueous mixture is formed by adding water to a sorbitol 70 solution (available from Roquette Freres S. A.) and then hydrating a binder material (gum arabic) with the water and sorbitol 70 solution mixture using a high shear mixer. A sweetener (granulated sugar) is admixed with the water, sorbitol 70 solution, and binder material and allowed to dissolve therein. The aqueous mixture is about 40 parts binder material, 41 parts sorbitol 70 solution, 5 parts sweetener, and 14 parts water.

The aqueous mixture is mixed with a sweetener (sucralose), a flavorant, a salt, a buffering agent (sodium hydroxide), water, a tobacco material blend of two types of tobacco material, and a tobacco-derived starch material in a Hobart mixing bowl to form a smokeless tobacco composition. The mixture of the smokeless tobacco composition is about 53 parts aqueous mixture, 22 parts tobacco material, 1.8 parts tobacco-derived starch component, 0.7 parts sucralose, 1.6 parts salt, 0.2 parts buffering agent, 2.7 parts flavorant, and 18 parts water.

The smokeless tobacco composition is heated to about 54° C. and then deposited into a starch mould. The smokeless tobacco composition remains in the starch mould for about 19 hours at about 60° C. The smokeless tobacco composition is allowed to cool and then removed from the starch mould. The smokeless tobacco composition is then cured at ambient room temperature for about 24 hours.

a) Starch Molded Formulation 3

A smokeless tobacco formulation suitable for use as a starch molded component of a smokeless tobacco product for oral use is provided in the following manner. An aqueous mixture is prepared by hydrating a binder material (gum arabic) with water and adding sodium hydroxide to adjust the mixture to a pH of 8.0. The mixture is heated to about 82° C. Separately, isomalt and maltitol syrup are combined and heated to about 166° C., cooled to about 132° C., and added to the aqueous mixture. Flavorant, salt, sucralose, glycerin, and heat-treated tobacco extract are added and mixed. The mixture of the smokeless tobacco composition is about 64.2 parts aqueous mixture (32 parts water, 32 parts binder, 0.2 parts buffering agent), 2.5 parts heat-treated tobacco material, 2.4 parts glycerin, 26.7 parts isomalt, 1.3 parts maltitol syrup, 0.3 parts sucralose, 2 parts salt, 0.6 parts flavorant.

The smokeless tobacco composition deposited into a starch mould at a temperature of about 71° C. (depositing temperature should be greater than about 66° C.). The smokeless tobacco composition remains in the starch mould for about 72 hours at about 60° C. The smokeless tobacco composition is allowed to cool and then removed from the starch mould. The smokeless tobacco composition is then cured at ambient room temperature for about 24 hours.

For other exemplary starch molded-type formulations, see U.S. application Ser. No. 12/957,821 to Cantrell et al., filed Dec. 1, 2010, which is incorporated herein by reference.

Example 4: Preparation of Injection Molded-Type Formulations (Pastilles)

a) Injection Molded Formulation 1

A smokeless tobacco formulation suitable for use as an injection molded component of a smokeless tobacco product for oral use is provided in the following manner. A humectant (available as HYSTAR 3375 from Corn Products International), an emulsifier (available as DUR-EM 117 from Loders Croklaan), corn syrup, glycerin and a flavorant are admixed and heated to form a liquid blend.

A tobacco material blend of two types of tobacco material having an average particle size of less than about 100 microns is mixed with salt, sucralose, a binder material (gum arabic) and polydextrose powder (available as LITESSE from Danisco A/S) in a Hobart mixing bowl. The liquid blend is added to the Hobart mixing bowl containing the tobacco material blend, binder material, and polydextrose powder, wherein the ingredients are admixed in Hobart mixer (Model N-50) for about 4-5 minutes at about 120 rpm to form a smokeless tobacco composition. The smokeless tobacco composition is passed through a meat grinder on the Hobart mixer to incorporate the liquid ingredients into the dry ingredients. The smokeless tobacco composition is extruded through a grinder apparatus. Upon extrusion, the smokeless tobacco composition is placed in a Hobart mixer to form a powder granulation. The mixture of the smokeless tobacco composition is about 14.6 parts binder material, 31.8 parts tobacco material, 29.2 parts humectant, 1 part emulsifier, 14.6 parts polydextrose, 3.6 parts corn syrup, 2.2 parts glycerin, 1.9 parts salt, 0.2 parts sucralose, and 0.8 parts flavorant.

The granulated smokeless tobacco composition is transferred to an injection mold and compressed at about 103,500 kPa for 1 minute. The mold is a stainless steel two-piece block that is filled with the smokeless tobacco composition and then compressed via engagement with a hydraulic press unit (Wabach Hydraulic Press, Model 12-102T, Serial 2201). The smokeless tobacco composition is removed from the injection mold after cooling at ambient temperature for about 60 minutes.

b) Injection Molded Formulation 2

A smokeless tobacco composition suitable for use as a smokeless tobacco product for oral use is provided in the following manner. A filler (maltitol; available as LYCASIN from Roquette Freres S.A.), an emulsifier (available as DUR-EM 117 from Loders Croklaan), corn syrup, glycerin and a flavorant are admixed and heated to form a liquid blend.

A tobacco material blend of two types of tobacco material having an average particle size of less than about 100 microns is mixed with salt, sucralose, a binder material (gum arabic) and a polysaccharide (maltodextrin; available as MALTRIN M100 from Grain Processing Corporation) in a Hobart mixing bowl. The liquid blend is added to the Hobart mixing bowl containing the tobacco material blend, binder material, and polysaccharide, wherein the ingredients are admixed in Hobart mixer (Model N-50) for about 4-5 minutes at about 120 rpm to form a smokeless tobacco composition. The smokeless tobacco composition is passed through a meat grinder on the Hobart mixer to incorporate the liquid ingredients into the dry ingredients. The smokeless tobacco composition is extruded through a grinder apparatus. Upon extrusion, the smokeless tobacco composition is placed in a Hobart mixer to form a powder granulation. The mixture of the smokeless tobacco composition is about 14.6 parts binder material, 31.8 parts tobacco material, 14.6 parts polysaccharide, 29.2 parts filler, 1 part emulsifier, 3.6 parts corn syrup, 2.2 parts glycerin, 1.9 parts salt, 0.2 parts sucralose, and 0.8 parts flavorant.

The granulated smokeless tobacco composition is transferred to an injection mold and compressed at about 103,500 kPa for 1 minute. The mold is a stainless steel two-piece block that is filled with the smokeless tobacco composition and then compressed via engagement with a hydraulic press unit (Wabach Hydraulic Press, Model 12-102T, Serial 2201). The smokeless tobacco composition is removed from the injection mold after cooling at ambient temperature for about 60 minutes.

c) Injection Molded Formulation 3

A smokeless tobacco composition suitable for use as a smokeless tobacco product for oral use is provided in the following manner. A filler (maltitol; available as LYCASIN from Roquette Freres S.A.), an emulsifier (available as DUR-EM 117 from Loders Croklaan), corn syrup, glycerin and a flavorant are admixed and heated to form a liquid blend.

A tobacco material blend of two types of tobacco material having an average particle size of less than about 100 microns is mixed with salt, sucralose, a binder material (gum arabic) and a polysaccharide (pullulan powder) in a Hobart mixing bowl. The liquid blend is added to the Hobart mixing bowl containing the tobacco material blend, binder material, and polysaccharide, wherein the ingredients are admixed in Hobart mixer (Model N-50) for about 4-5 minutes at about 120 rpm to form a smokeless tobacco composition. The smokeless tobacco composition is passed through a meat grinder on the Hobart mixer to incorporate the liquid ingredients into the dry ingredients. The smokeless tobacco composition is extruded through a grinder apparatus. Upon extrusion, the smokeless tobacco composition is placed in a Hobart mixer to form a powder granulation. The mixture of the smokeless tobacco composition is about 14.6 parts binder material, 31.8 parts tobacco material, 14.6 parts polysaccharide, 29.2 parts filler, 1 part emulsifier, 3.6 parts corn syrup, 2.2 parts glycerin, 1.9 parts salt, 0.2 parts sucralose, and 0.8 parts flavorant.

The granulated smokeless tobacco composition is transferred to an injection mold and compressed at about 103,500 kPa for 1 minute. The mold is a stainless steel two-piece block that is filled with the smokeless tobacco composition and then compressed via engagement with a hydraulic press unit (Wabach Hydraulic Press, Model 12-102T, Serial 2201). The smokeless tobacco composition is removed from the injection mold after cooling at ambient temperature for about 60 minutes.

d) Injection Molded Formulation 4

A smokeless tobacco composition suitable for use as a smokeless tobacco product for oral use is provided in the following manner. A humectant (available as HYSTAR 3375 from Corn Products International), an emulsifier (available as DUR-EM 117 from Loders Croklaan), corn syrup, glycerin and a flavorant are admixed and heated to form a liquid blend.

A tobacco material blend of two types of tobacco material having an average particle size of less than about 100 microns is mixed with salt, sucralose, a binder material (gum arabic) and polydextrose powder (available as LITESSE from Danisco A/S) in a Hobart mixing bowl. The liquid blend is added to the Hobart mixing bowl containing the tobacco material blend, binder material, and polydextrose powder, wherein the ingredients are admixed in Hobart mixer (Model N-50) for about 4-5 minutes at about 120 rpm to form a smokeless tobacco composition. The smokeless tobacco composition is passed through a meat grinder on the Hobart mixer to incorporate the liquid ingredients into the dry ingredients. The smokeless tobacco composition is extruded through a grinder apparatus. Upon extrusion, the smokeless tobacco composition is placed in a Hobart mixer to form a powder granulation. The mixture of the smokeless tobacco composition is about 15.1 parts binder material, 32.9 parts tobacco material, 26.9 parts humectant, 1.1 parts emulsifier, 15.1 parts polydextrose, 3.8 parts corn syrup, 2.3 parts glycerin, 1.9 parts salt, 0.2 parts sucralose, and 0.9 parts flavorant.

The granulated smokeless tobacco composition is transferred to an injection mold and compressed at about 103,500 kPa for 1 minute. The mold is a stainless steel two-piece block that is filled with the smokeless tobacco composition and then compressed via engagement with a hydraulic press unit (Wabach Hydraulic Press, Model 12-102T, Serial 2201). The smokeless tobacco composition is removed from the injection mold after cooling at ambient temperature for about 60 minutes.

e) Injection Molded Formulation 5

A smokeless tobacco composition suitable for use as a smokeless tobacco product for oral use is provided in the following manner. A humectant (available as HYSTAR 3375 from Corn Products International), an emulsifier (available as DUR-EM 117 from Loders Croklaan), corn syrup, glycerin and a flavorant are admixed and heated to form a liquid blend.

A tobacco material blend of two types of tobacco material having an average particle size of less than about 100 microns is mixed with salt, sucralose, a binder material (gum arabic) and polydextrose powder (available as LITESSE from Danisco A/S) in a Hobart mixing bowl. The liquid blend is added to the Hobart mixing bowl containing the tobacco material blend, binder material, and polydextrose powder, wherein the ingredients are admixed in Hobart mixer (Model N-50) for about 4-5 minutes at about 120 rpm to form a smokeless tobacco composition. The smokeless tobacco composition is passed through a meat grinder on the Hobart mixer to incorporate the liquid ingredients into the dry ingredients. The smokeless tobacco composition is extruded through a grinder apparatus. Upon extrusion, the smokeless tobacco composition is placed in a Hobart mixer to form a powder granulation. The mixture of the smokeless tobacco composition is about 25.2 parts binder material, 3 parts tobacco material (pure spray dried tobacco extract), 30.6 parts humectant, 1.1 parts emulsifier, 25.2 parts polydextrose, 6 parts corn syrup, 4 parts glycerin, 1.9 parts salt, 0.2 parts sucralose, and 0.9 parts flavorant.

The granulated smokeless tobacco composition is transferred to an injection mold and compressed at about 103,500 kPa for 1 minute. The mold is a stainless steel two-piece block that is filled with the smokeless tobacco composition and then compressed via engagement with a hydraulic press unit (Wabach Hydraulic Press, Model 12-102T, Serial 2201). The smokeless tobacco composition is removed from the injection mold after cooling at ambient temperature for about 60 minutes.

For other representative injection molded-type formulations, see U.S. patent application Ser. No. 12/957,838 to Cantrell et al., filed Dec. 1, 2010, which is incorporated herein by reference.

Example 5: Preparation of Chewable-Type Formulation

A smokeless tobacco formulation suitable for use as a chewable component of a smokeless tobacco product for oral use is provided in the following manner. An aqueous mixture is prepared. The aqueous mixture is formed by adding tobacco extract and hydrating a binder material (gum arabic) with the water. The aqueous mixture is about 47 parts binder, about 6 parts tobacco extract, and about 47 parts water.

The aqueous mixture is mixed with a salt (NaCl), a buffering agent (sodium hydroxide), a sweetener (sucralose), glycerin, and an emulsifier (sunflower lecithin) and the added components are allowed to dissolve therein. The mixture is heated to about 49° C. The heated mixture is combined with a lipid substance having a melting point of about 38° C. to about 42° C. (available as 108-24-B from AarhusKarlshamn USA Inc.), which has been heated to a melt and flavorant. The mixture of the smokeless tobacco composition is about 36 parts aqueous mixture (about 32 parts gum arabic and 4 parts tobacco material), 24 parts lipid substance, 6 parts glycerin, 0.2 parts emulsifier component, 0.2 parts sucralose, 0.6 parts salt, 0.3 parts buffering agent, 0.6 parts flavorant, and 32 parts water.

The smokeless tobacco composition is formed in various ways. In one example, it is deposited into a mold and remains in the mold at ambient conditions until dry and then removed from the mold. In another example, it is poured onto a tabletop to air dry to a semi-moist state and formed into desired shapes using a drop roller.

Example 6: Preparation of Hard Coating-Type Formulation

An aqueous mixture is prepared by adding sodium hydroxide, tobacco extract, and a binder (CMC-15) and the mixture is heated to about 57° C. The aqueous mixture is about 0.3 parts sodium hydroxide, about 5 parts tobacco extract, about 13 parts CMC-15, and about 83 parts water. A mixture of sorbitol, isomalt, maltitol syrup, and sucralose is melted to a liquid, cooled to about 135° C., and added to the aqueous mixture. Flavorant and pigment (to provide a pearlescent appearance) is added to give a smokeless tobacco composition that is about 10 parts aqueous mixture (about 3 parts tobacco extract), about 7 parts sorbitol, about 26.2 parts isomalt, about 0.2 parts sucralose, about 8.2 parts maltitol syrup, about 0.2 parts flavorant, and about 48.2 parts water.

The resulting formulation can be cast into sheets (e.g., by casting into sheets on stainless steel plates) or dip- or spray-coated onto the composition described previously in this example. When the formulation is cast into sheets, it can be cut (e.g., with a casting knife) and applied as a sandwiched coating onto the composition described previously in this example. When the formulation is dip- or spray-coated, it is maintained at a temperature of greater than about 66° C., applied as a liquid, and then cooled to harden.

Example 7: Preparation of 2-Layered Products a) Lozenge/Meltable

A lozenge-type formulation comprising ultrafiltered tobacco extract is prepared as described in Example 1, poured into molds, and cooled. A meltable-type formulation as described in Example 2 is prepared. However, rather than pouring the flowable slurry into molds, it is applied directly to the surface of the cooled lozenge-type formulation. For example, the molded lozenge-type formulations are dipped into the flowable slurry and it is allowed to dry and harden at room temperature to provide a 2-layered product comprising a lozenge-type core and a meltable-type coating.

b) Lozenge/Chewable

A lozenge-type formulation comprising ultrafiltered tobacco extract is prepared as described in Example 1, poured into molds, and cooled. A chewable formulation as described in Example 5 is prepared. The formulation is poured onto a tabletop to air dry to a semi-moist state and formed around the surface of the lozenge-type formulations to provide a 2-layered product comprising a lozenge-type core and a chewable-type coating.

c) Lozenge/Hard Coating

A lozenge-type formulation comprising ultrafiltered tobacco extract is prepared as described in Example 1, poured into molds, and cooled. A hard coating-type formulation as described in Example 6 is prepared. The coated formulation is cast into sheets, cut, and applied directly to the surface of the lozenge-type product as a sandwich coating to provide a 2-layered product comprising a lozenge-type core and a hard coating-type coating.

d) Meltable/Lozenge

A meltable-type formulation comprising particulate tobacco or an aqueous tobacco extract is prepared as described in Example 2. A lozenge-type formulation as described in Example 1 is prepared, except that rather than pouring the hot mixture into molds, it is applied directly to the surface of the meltable-type formulation. For example, the hot mixture may be introduced into spray coating equipment adapted to maintain a temperature of about 132° C. and sprayed onto the surface of the cooled meltable-type formulation. As noted in Example 1, the mixture must be held at an elevated temperature to maintain sufficient flexibility and pliability to be manipulated into the desired shape. Because the meltable-type formulation may exhibit some degree of melting at such an elevated temperature, steps must be taken to avoid or limit the melting of the meltable-type formulation during the application of the lozenge-type formulation. For example, the meltable-type formulation may be frozen prior to applying the lozenge-type formulation to limit the degree of melting.

e) Meltable/Hard Coating

A meltable-type formulation particulate tobacco or an aqueous tobacco extract is prepared as described in Example 2. A hard coating-type formulation as described in Example 6 is prepared. The coated formulation is cast into sheets, cut, and applied directly to the surface of the meltable-type product as a sandwich coating to provide a 2-layered product comprising a meltable-type core and a hard coating-type coating.

f) Starch Molded/Meltable

A starch molded-type formulation is prepared as described in Example 3, poured into molds, and cooled. A meltable-type formulation as described in Example 2 is prepared. However, rather than pouring the flowable slurry into molds, it is applied directly to the surface of the cooled starch molded-type formulation. For example, the starch molded-type formulations are dipped into the flowable slurry and it is allowed to dry and harden at room temperature to provide a 2-layered product comprising a starch molded-type core and a meltable-type coating.

g) Starch Molded/Lozenge

A starch molded-type formulation is prepared as described in Example 3, poured into molds, and cooled. A lozenge-type formulation as described in Example 1 is prepared, except that rather than pouring the hot mixture into molds, it is applied directly to the surface of the starch molded-type formulation. For example, the hot mixture may be introduced into spray coating equipment adapted to maintain a temperature of about 132° C. and sprayed onto the surface of the cooled starch molded-type formulation. As noted in Example 1, the mixture must be held at an elevated temperature to maintain sufficient flexibility and pliability to be manipulated into the desired shape.

h) Injection Molded/Meltable

An injection molded-type formulation is prepared as described in Example 4, injection molded into the desired size and shape, and cooled. A meltable-type formulation as described in Example 2 is prepared. However, rather than pouring the flowable slurry into molds, it is applied directly to the surface of the cooled injection molded-type formulation. For example, the injection molded-type formulations are dipped into the flowable slurry and it is allowed to dry and harden at room temperature to provide a 2-layered product comprising an injection molded-type core and a meltable-type coating.

i) Injection molded/Lozenge

An injection molded-type formulation is prepared as described in Example 4, injection molded into the desired size and shape, and cooled. A lozenge-type formulation as described in Example 1 is prepared, except that rather than pouring the hot mixture into molds, it is applied directly to the surface of the injection molded-type formulation. For example, the hot mixture may be introduced into spray coating equipment adapted to maintain a temperature of about 132° C. and sprayed onto the surface of the cooled injection molded-type formulation. As noted in Example 1, the mixture must be held at an elevated temperature to maintain sufficient flexibility and pliability to be manipulated into the desired shape.

Example 8: Preparation of 3-Layered Products a) Lozenge/Meltable/Hard Coating

A 2-layered product comprising a lozenge-type core and a meltable-type coating is prepared as described above in Example 7a. A hard coating-type formulation as described in Example 6 is prepared. The coated formulation is cast into sheets, cut, and applied directly to the surface of the 2-layered lozenge/meltable composition as a sandwich coating to provide a 3-layered product comprising a lozenge-type core, a meltable-type first coating and a hard coating-type second coating.

b) Starch Molded/Lozenge/Meltable

A 2-layered product comprising a starch molded-type core and a lozenge-type coating is prepared as described above in Example 7g. A meltable-type formulation as described in Example 2 is prepared. However, rather than pouring the flowable slurry into molds, it is applied directly to the surface of the cooled 2-layered starch molded/lozenge composition. For example, the 2-layered composition is dipped into the flowable slurry and it is allowed to dry and harden at room temperature to provide a 3-layered product comprising a starch molded-type core, a lozenge-type first coating and a meltable-type second coating.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A multi-layered smokeless tobacco product comprising two or more formulations having different organoleptic properties, wherein the formulations are selected from the group consisting of:
   i) a dissolvable formulation comprising a sugar substitute in an amount of at least about 80% by weight and a sugar alcohol syrup, wherein the dissolvable formulation comprises a translucent, ultrafiltered tobacco extract consisting of only compounds with molecular weight below about 5,000 Da;
   ii) a meltable formulation comprising a lipid having a melting point of about 36° C. to about 45° C.;
   iii) a pastille formulation comprising a polysaccharide filler;
   iv) a lightly chewable pastille formulation in the form of a hardened solid gel, wherein the lightly chewable pastille formulation comprises a tobacco extract in an amount of about 2% by weight or greater; one or both of glycerin and propylene glycol in an amount of about 0.5% by weight or greater; a sugar alcohol filler in an amount of about 20% by weight or greater; and a natural gum binder in an amount of about 10% or greater;
   v) a chewable formulation comprising a binder, an emulsifier, and a lipid having a melting point of about 36° C. to about 45° C.; and
   vi) a hard coating formulation comprising a binder, a sugar substitute, and a sugar alcohol syrup;
   wherein the multi-layer smokeless tobacco product is translucent, and wherein the multi-layered smokeless tobacco product is in the form of a core surrounded by a continuous outer layer, wherein the core comprises formulation (i) and the continuous outer layer comprises formulation (iv).

2. The multi-layered smokeless tobacco product of claim 1, wherein all formulations of the multi-layered smokeless tobacco product comprise tobacco, in the form of a particulate tobacco material or a tobacco extract.

3. The multi-layered smokeless tobacco product of claim 2, wherein the tobacco extract is a heat-treated extract that can be characterized as having an acrylamide content of less than about 500 ng/g.

4. The multi-layered smokeless tobacco product of claim 1, wherein the sugar substitute of the dissolvable formulation comprises isomalt and wherein the sugar alcohol syrup of the dissolvable formulation comprises maltitol syrup.

5. The multi-layered smokeless tobacco product of claim 1, wherein the dissolvable formulation comprises the tobacco extract in an amount of about 3% by weight or greater.

6. The multi-layer smokeless tobacco product of claim 1, wherein one of formulations (i) and (iv) has a first, fast rate of release of active components of the tobacco extract; and the other of formulations (i) and (iv) has a second, extended rate of release of active components of the tobacco extract, wherein the first, fast rate is faster than the second, extended rate when the multi-layer smokeless tobacco product is placed in the mouth of a user, thereby allowing for a release profile with both fast and extended release of active components of the tobacco.

* * * * *